(12) United States Patent
Myren et al.

(10) Patent No.: US 12,554,361 B2
(45) Date of Patent: Feb. 17, 2026

(54) TOUCH-SENSITIVE APPARATUS AND METHOD

(71) Applicant: TouchNetix Limited, Fareham (GB)

(72) Inventors: Steinar Myren, Trondheim (NO); Stephen William Roberts, Fareham (GB); Trond Jarle Pedersen, Trondheim (NO)

(73) Assignee: TouchNetix Limited, Fareham (GB)

( * ) Notice: Subject to any disclaimer, the term of this patent is extended or adjusted under 35 U.S.C. 154(b) by 0 days.

(21) Appl. No.: 18/261,541

(22) PCT Filed: Jan. 10, 2022

(86) PCT No.: PCT/GB2022/050039
§ 371 (c)(1),
(2) Date: Jul. 14, 2023

(87) PCT Pub. No.: WO2022/157483
PCT Pub. Date: Jul. 28, 2022

(65) Prior Publication Data
US 2024/0086013 A1   Mar. 14, 2024

(30) Foreign Application Priority Data

Jan. 20, 2021   (GB) .................................... 2100727

(51) Int. Cl.
*G06F 3/041*   (2006.01)
*G06F 3/044*   (2006.01)

(52) U.S. Cl.
CPC ...... *G06F 3/04182* (2019.05); *G06F 3/04166* (2019.05); *G06F 3/0446* (2019.05)

(58) Field of Classification Search
None
See application file for complete search history.

(56) References Cited

U.S. PATENT DOCUMENTS

| | | | |
|---|---|---|---|
| 2011/0187390 A1* | 8/2011 | Lin .................... | G01R 27/2605 324/679 |
| 2013/0141372 A1* | 6/2013 | Kang .................... | G06F 3/0446 345/173 |

(Continued)

FOREIGN PATENT DOCUMENTS

GB   2584669 A   12/2020

OTHER PUBLICATIONS

Combined Search and Examination Report issued by the United Kingdom Intellectual Property Office for priority United Kingdom patent application No. GB2100727.3, mailed May 27, 2021.

(Continued)

*Primary Examiner* — Sepehr Azari
(74) *Attorney, Agent, or Firm* — Renner, Otto, Boisselle & Sklar, LLP.

(57) ABSTRACT

Described is a touch-sensitive apparatus, including: a plurality of electrodes comprising at least a first electrode and a second electrode; drive circuitry configured to generate a drive signal for driving one or more of the plurality of electrodes; a differential output element comprising a first input and a second input configured to couple to each of the first electrode and second electrode and configured to output a signal indicative of the differential between signals input to the differential output element at the first input and the second input; switching circuitry configured to couple the first electrode to either of the first input or second input of the differential output element and to couple the second electrode to either of the first input or second input of the differential output element; and processing circuitry.

17 Claims, 10 Drawing Sheets

(56) References Cited

U.S. PATENT DOCUMENTS

| | | | |
|---|---|---|---|
| 2015/0185913 A1* | 7/2015 | Han | G06F 3/044 |
| | | | 345/174 |
| 2015/0338952 A1 | 11/2015 | Shahparnia | |
| 2015/0355741 A1* | 12/2015 | Chang | G06F 3/04166 |
| | | | 345/173 |
| 2016/0062519 A1* | 3/2016 | Park | G06F 3/0446 |
| | | | 345/173 |
| 2016/0291766 A1* | 10/2016 | Shen | G06F 3/04166 |
| 2016/0306465 A1* | 10/2016 | Ahn | G06F 3/04166 |
| 2018/0181230 A1* | 6/2018 | Chang | G06F 3/04166 |
| 2019/0114007 A1* | 4/2019 | Mugiraneza | G06F 3/0446 |
| 2021/0294449 A1* | 9/2021 | Shen | G06F 3/0416 |
| 2022/0300109 A1* | 9/2022 | Liu | H03F 3/45475 |
| 2022/0382451 A1* | 12/2022 | Bihday | G06F 3/0446 |

OTHER PUBLICATIONS

International Search Report and Written Opinion issued by the European Patent Office for priority International Application No. PCT/GB2022/050039, mailed Apr. 13, 2022.

* cited by examiner

| Switch | Time Period 1 | Time Period 2 |
|--------|---------------|---------------|
| A | Closed | Closed |
| B | Open | Open |
| C | Closed | Open |
| D | Open | Closed |

TOUCH-SENSITIVE APPARATUS AND METHOD

This application is a national phase of International Application No. PCT/GB2022/050039 filed Jan. 10, 2022, which claims priority to United Kingdom Application No. 2100727.3, filed Jan. 20, 2021, each of which is hereby incorporated herein by reference in its entirety.

BACKGROUND OF THE INVENTION

The present invention relates to the field of touch sensors, for example touch sensors for overlying a display screen to provide a touch-sensitive display (touch screen). In particular, embodiments of the invention relate to techniques for improving signal to noise ratio in capacitive based touch-sensors.

A capacitive touch sensor can be generalised as one that uses a physical sensor element comprising an arrangement of electrically conductive electrodes extending over a touch sensitive area (sensing area) to define sensor nodes (or intersection points) and controller circuitry connected to the electrodes and operable to measure changes in the electrical capacitance of each of the electrodes or the mutual-capacitance between combinations of the electrodes. The electrodes are typically provided on a substrate.

For capacitive touch sensors, typically the capacitance of a plurality of electrodes and/or a plurality of intersection points are measured to identify whether a touch (or other object) is sensed by the electrode(s), e.g., by identifying deviations in the measured capacitance from an expected capacitance. To be able to identify whether a touch or object has been detected, a complete scan of the electrode(s) is performed. A greater number of electrodes in the touch sensor generally leads to greater spatial resolution (that is, the touch sensor can resolve the position of the touch sensed by the electrodes at the sensing surface to a finer resolution), which is desired in many applications.

Touch sensors can be broadly assessed in accordance with at least two characteristics, namely the sensitivity of the touch sensor (i.e., how easily the touch sensor can detect a genuine touch) and the responsiveness of the touch sensor (i.e., how quickly the touch sensor can detect/register a touch on the sensing surface from the moment a touch is present). The sensitivity is broadly proportional to the time taken to measure the capacitance at of the electrodes or electrode combinations—generally, the greater the measurement time period, the better the sensitivity. Conversely, the responsiveness is broadly proportional to the time required to measure the capacitance of all electrodes or intersection points—generally, the shorter the time, the better the responsiveness.

Most applications for touch sensors require both good sensitivity and good responsiveness, but as evident from above, a balance must be struck between the two parameters. One way to help improve the sensitivity and/or responsiveness is to employ faster electronics which can sample a signal at a higher sample rate. However, faster electronics are usually expensive and may be relatively large, and are thus are not practical for commercial applications.

There is therefore a desire to provide touch sensors which can offer an improvement in responsiveness and/or sensitivity in detecting touches.

SUMMARY OF THE INVENTION

According to a first aspect of the invention there is provided a touch-sensitive apparatus. The apparatus includes: a plurality of electrodes comprising at least a first electrode and a second electrode; drive circuitry configured to generate a drive signal for driving one or more of the plurality of electrodes; a differential output element comprising a first input and a second input configured to couple to each of the first electrode and second electrode and configured to output a signal indicative of the differential between signals input to the differential output element at the first input and the second input; switching circuitry configured to couple the first electrode to either of the first input or second input of the differential output element and to couple the second electrode to either of the first input or second input of the differential output element; and processing circuitry. The processing circuitry is configured to: obtain a first output from the differential output element during a first time period, wherein the switching circuitry is in a first configuration during the first time period; obtain a second output from the differential output element during a second time period, wherein the switching circuitry is in a second configuration during the second time period; and determine a resultant signal corresponding to a capacitance as sensed by the first or second electrodes based on both the first output and the second output.

According to a second aspect of the invention there is provided a system comprising the touch-sensitive apparatus of the first aspect of the invention, further comprising system processing circuitry communicatively coupled to the processing circuitry of the touch-sensitive apparatus.

According to a third aspect of the invention there is provided a method for operating a touch-sensitive element of a touch-sensitive apparatus, the touch sensitive apparatus comprising a plurality of electrodes, comprising at least a first electrode and a second electrode. The method includes: applying a drive signal to at least one of the plurality of electrodes; obtaining a first output from a differential output element during a first time period, wherein switching circuitry configured to couple the first electrode to either of the first input or second input of the differential output element and to couple the second electrode to either of the first input or second input of the differential output element is in a first configuration during the first time period; obtaining a second output from the differential output element during a second time period, wherein the switching circuitry is in a second configuration during the second time period; and determining a resultant signal corresponding to a capacitance as sensed by the first or second electrodes based on both the first output and the second output.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which:

FIG. 9a illustrates a transimpedance amplifier and FIG. 9b illustrates a standard instrument amplifier;

DETAILED DESCRIPTION

Broadly speaking, the present invention relates to a touch-sensitive apparatus which can offer improvements to the signal to noise ratio for signals obtained that are indicative of sensed capacitances (and/or alternatively the responsiveness of the system). In particular, the present disclosure provides techniques for measuring combinations of signals indicative of capacitances sensed by individual electrodes and processing the signals accordingly to obtain a better signal to noise ratio and/or a better responsiveness of the touch-sensitive apparatus as compared to measuring the signal indicative of a capacitance sensed by each individual electrode sequentially. More specifically, the apparatus obtains a first output during a first time period which is a first combination of the individual signals sensed by at least a first and second electrode, obtains a second output during a second time period which is a second combination of the individual signals sensed by at least the first and second electrode, and then determines a resultant signal corresponding to a capacitance as sensed by the first or second electrodes using both the first output and the second output.

Figure 1:
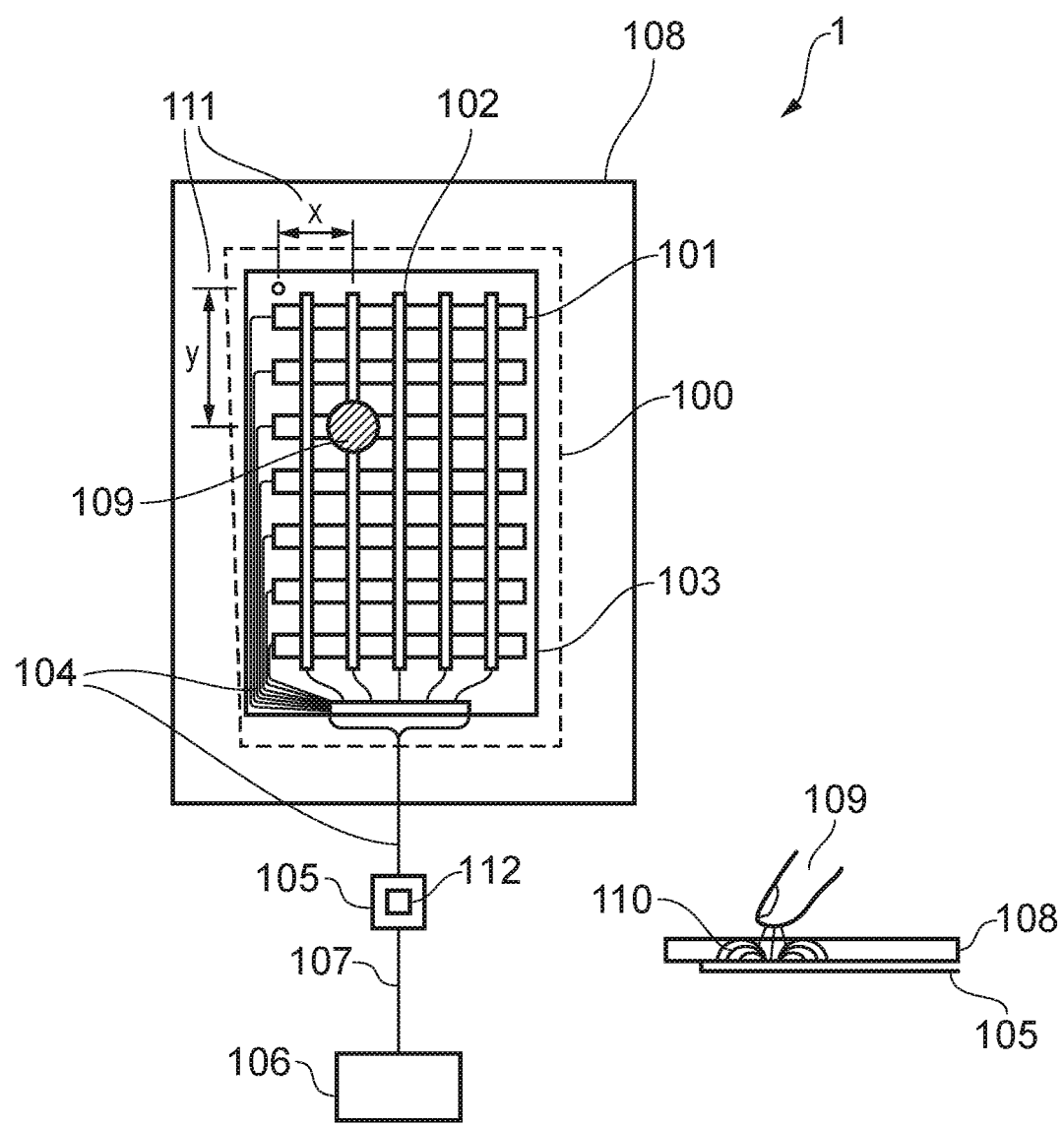
FIG. 1 schematically illustrates a touch sensitive apparatus in accordance with certain embodiments of the invention.

FIG. 1 schematically shows a touch-sensitive apparatus 1 in accordance with the principals of the present disclosure. The touch-sensitive apparatus 1 is represented in plan view (to the left in the figure) and also in cross-sectional view (to the right in the figure).

The touch-sensitive apparatus 1 comprises a sensor element 100, measurement circuitry 105, processing circuitry 106, and cover 108. The sensor element 100 and cover 108 may, more generally be referred to as a touch screen or touch-sensitive element of the touch-sensitive apparatus 1, while the measurement circuitry 105 and processing circuitry 106 may, more generally, be referred to as the controller or control circuitry of the touch-sensitive apparatus 1.

The touch screen is primarily configured for establishing the position of a touch within a two-dimensional sensing area by providing Cartesian coordinates along an X-direction (horizontal in the figure) and a Y-direction (vertical in the figure). In this implementation, the sensor element 100 is constructed from a substrate 103 that could be glass or plastic or some other insulating material and upon which is arranged an array of electrodes consisting of multiple laterally extending parallel electrodes, X-electrodes 101 (row electrodes), and multiple vertically extending parallel electrodes, Y-electrodes 102 (column electrodes), which in combination allow the position of a touch 109 to be determined. To clarify the terminology, and as will be seen from FIG. 1, the X-electrodes 101 (row electrodes) are aligned parallel to the X-direction and the Y-electrodes 102 (column electrodes) are aligned parallel to the Y-direction. Thus the different X-electrodes allow the position of a touch to be determined at different positions along the Y-direction while the different Y-electrodes allow the position of a touch to be determined at different positions along the X-direction. That is to say in accordance with the terminology used herein, the electrodes are named (in terms of X- and Y-) after their direction of extent rather than the direction along which they resolve position. Furthermore, the electrodes may also be referred to as row electrodes and column electrodes. It will however be appreciated these terms are simply used as a convenient way of distinguishing the groups of electrodes extending in the different directions. In particular, the terms are not intended to indicate any specific electrode orientation. In general the term "row" will be used to refer to electrodes extending in a horizontal direction for the orientations represented in the figures while the terms "column" will be used to refer to electrodes extending in a vertical direction in the orientations represented in the figures. The X-electrodes 101 and Y-electrodes 102 define a sensing (or sense) area, which is a region of the substrate 103 which is sensitive to touch.

In some cases, each electrode may have a more detailed structure than the simple "bar" structures represented in FIG. 1, but the operating principles are broadly the same. The sensor electrodes are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided as an alternative to a mouse in laptop computers is usually opaque, and hence can use lower cost copper electrodes and an epoxy-glass-fibre substrate (e.g. FR4).

Referring back to FIG. 1, the electrodes 101, 102 are electrically connected via circuit conductors 104 to measurement circuitry 105, which is in turn connected to processing circuitry 106 by means of one or more circuit conductors 107. The measurement circuitry 105 and/or the processing circuitry 106 may each be provided by a (micro) controller, processor, ASIC or similar form of control chip. Although shown separately in FIG. 1, in some implementations, the measurement circuitry and the processing circuitry may be provided by the same (micro)controller, processor, ASIC or similar form of control chip. The measurement circuitry 105 and/or the processing circuitry 106 may be comprised of a printed circuit board (PCB), which may further include the various circuit conductors 104, 107.

The measurement circuitry 105 and the processing circuitry 106 may be formed on the same PCB, or separate PCBs. Note also that the functionality provided by either of the measurement circuitry 105 and the processing circuitry 106 may be split across multiple circuit boards and/or across components which are not mounted to a PCB.

Generally speaking, the measurement circuitry 105 is configured to perform capacitance measurements associated with the electrodes 101, 102 (described in more detail below). The measurement circuitry 105 comprises drive circuitry 112 for generating electrical signals (such as a time-varying voltage signal) for performing the capacitance measurements. The measurement circuitry 105 outputs the capacitance measurements to the processing circuitry 106, which is arranged to perform processing using the capacitance measurements. The processing circuitry 106 may be configured to perform a number of functions, but at the very least is configured to determine when a touch 109, caused by an object such a human finger or a stylus coming into contact with (or being adjacent to) the sense area of the sensor element 100 with appropriate analysis of relative changes in the electrodes' measured capacitance/capacitive coupling. This determination process is described in more detail below. The processing circuitry 106, as in the described implementation, may also be configured to, with appropriate analysis of relative changes in the electrodes' measured capacitance/capacitive coupling, calculate a touch position on the cover's surface as an X-Y coordinate 111.

In the example, a front cover (also referred to as a lens or panel) 108 is positioned in front of the substrate 103 and a single touch 109 on the surface of the cover 108 is schematically represented. Note that the touch itself does not generally make direct galvanic connection to the sensor 103 or to the electrodes 102. Rather, the touch influences the electric fields 110 that the measurement circuitry 105 generates using the electrodes 102 (described in more detail below).

In the foregoing, the principles of the present disclosure will be described with respect to a touch-sensitive apparatus 1 configured to obtain measurements of the mutual capacitances between pairs of electrodes at points where the electrodes intersect (otherwise referred to as intersection points or nodes). However, it should be appreciated that the principles of the present application may be applied to touch-sensitive apparatuses configured to obtain measurements of the self-capacitance of an electrode.

Figure 2:
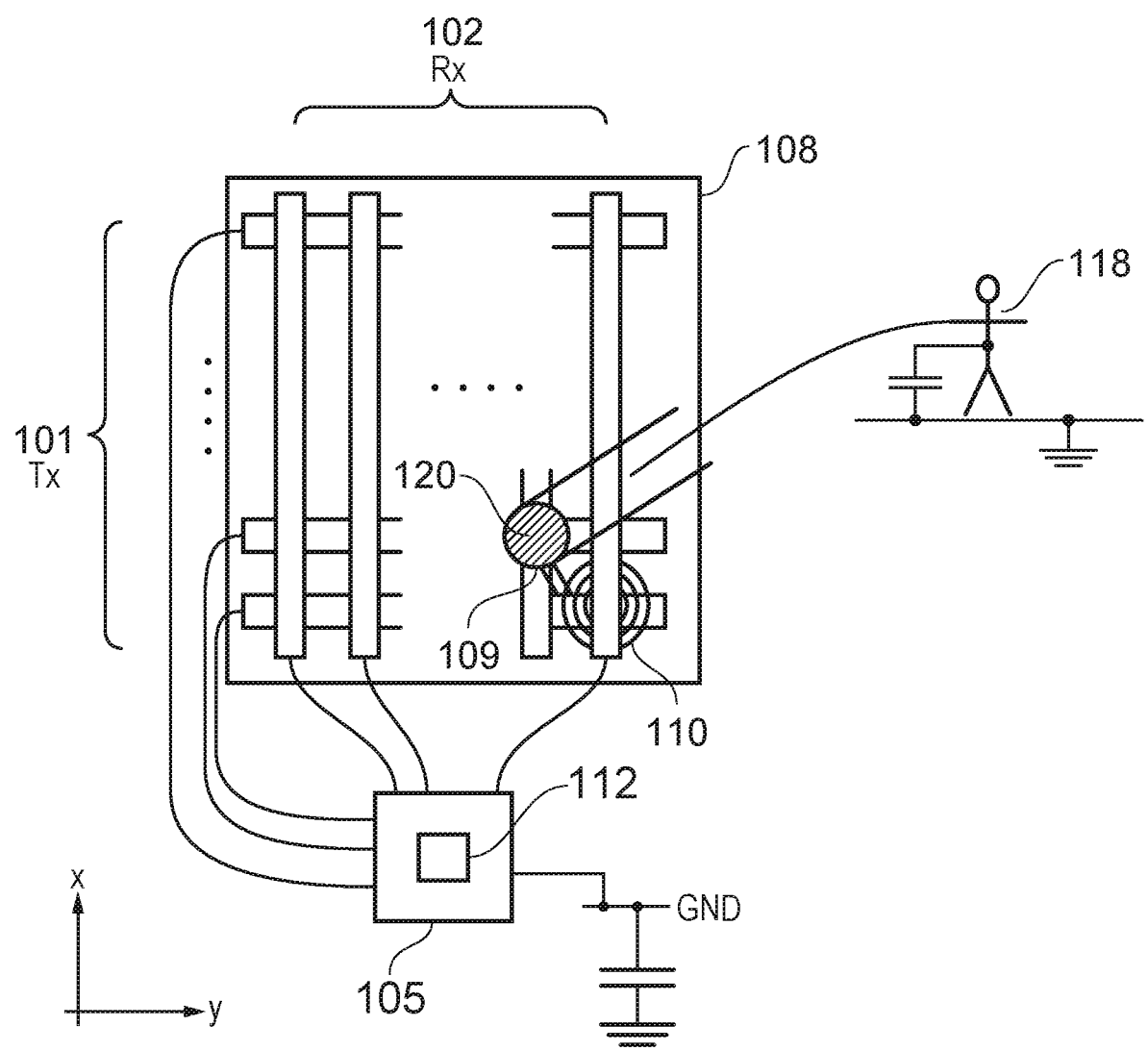
FIG. 2 schematically illustrates the mutual-capacitance approach applied to the touch sensitive apparatus of FIG. 1 in more detail, specifically with a view to explaining the principles of mutual capacitance measurement technique.

Accordingly, the measurement circuitry 105 of the described implementation is configured to measure the capacitance of the electrodes using a technique that is based on measuring what is frequently referred to as "mutual-capacitance". Reference is made to FIG. 2. In FIG. 2, the drive circuitry 112 of the measurement circuitry 105 is configured to generate and apply an electrical stimulus (drive signal) 113 to sequentially stimulate each of an array of transmitter (driven/drive) electrodes, shown as the X electrodes 101 in FIG. 2 and labelled as "Tx", that are coupled by virtue of their proximity to an array of receiver electrodes, shown as the Y electrodes 102 in FIG. 2 and labelled as "Rx". (It should be appreciated that the Y electrodes 102 may instead be the transmitting electrodes and the X electrodes 101 may instead be the receiving electrodes in other implementations, and the measurement circuitry 105 in some implementations may be able to switch between driving the X electrodes 101 and driving the Y electrodes 102).

When a transmitting electrode, Tx, has the drive signal applied thereto (i.e., the transmitting electrode is "driven"), the resulting electric field 110 is now directly coupled from the transmitter to each of the nearby receiver electrodes. The area local to and centred on the intersection of a transmitter and a receiver electrode is typically referred to as the "node" or "intersection point". Note that the transmitter and receiver electrode do not necessarily need to physically intersect or overlap one another; in some implementations, the intersection may be an intersection of a region close to each of the electrodes (for instance the electrodes may be interdigitated). Now, on application or approach of a conductive element such as a human finger, the electric field 110 is partly diverted to the touching object. That is, some of the field couples via the finger through the connected body 118, through free space and back to the measurement circuitry 105. An extra return path to the measurement circuitry 105 is hence established via the body 118 and "free-space". However, because this extra return path acts to couple the diverted field directly to the measurement circuitry 105, the amount of field coupled to the nearby receiver electrode 102 decreases. This is measured by the measurement circuitry 105 as a decrease in the "mutual-capacitance" between that particular transmitter electrode and receiver electrodes in the vicinity of the touch 109 relative to a mutual capacitance that is obtained in the absence of the touch 109. The measurement circuitry 105 senses this change in capacitance of one or more nodes. For example, if a reduction in capacitive coupling to a given Y-electrode is observed while a given X-electrode is being driven, it may be determined there is a touch in the vicinity of where the given X-electrode and given Y-electrode cross, or intersect, within the sensing area of the sensor element 100. The magnitude of a capacitance change is nominally proportional to the area 120 of the touch (although the change in capacitance does tend to saturate as the touch area increases beyond a certain size to completely cover the nodes directly under the touch) and weakly proportional to the size of the touching body (for reasons as described above). The magnitude of the capacitance change also reduces as the distance between the touch sensor electrodes and the touching object increases.

In the described implementation, the electrodes 101, 102 are arranged on an orthogonal grid, with a first set of electrodes (e.g., the transmitter electrodes 101) on one side of a substantially insulating substrate 103 and the other set of electrodes (e.g., the receive electrodes 102) on the opposite side of the substrate 103 and oriented at substantially 90° to the first set. In other implementations, the electrodes may be oriented at a different angle (e.g., 30°) relative to one another. In addition, it should also be appreciated that it is also possible to provide structures where the grid of electrodes is formed on a single side of the substrate 103 and small conductive bridges are used to allow the two orthogonal sets of electrodes to cross each other without short circuiting. However, these designs are more complex to manufacture and less suitable for transparent sensors. Regardless of the arrangement of the electrodes, broadly speaking, one set of electrodes is used to sense touch position in a first axis that we shall call "X" and the second set to sense the touch position in the second orthogonal axis that we shall call "Y".

The mutual capacitance measurement technique offers some advantages over other techniques, such as self-capacitance measurement techniques, in that mutual capacitance measurement techniques can identify mutual capacitance changes independently at each of the electrode intersection points. This means that the mutual capacitance technique lends itself to applications which require the detection of multiple touches as inputs to associated apparatuses (such as a PC or other computing device running a software application). However, the mutual capacitance technique is generally not as sensitive to touches as other techniques such as self-capacitance measurement techniques, partly due to the fact that sources of noise have a much more significant impact in mutual capacitance measurement techniques. What this means is that it may be more difficult when using mutual capacitance measurement techniques to correctly identify a touch as genuine (i.e., resulting from a user touching the touch-sensitive apparatus 1) as opposed to a source of noise. In order to increase the sensitivity, a greater sample time is required for sampling the signal (i.e., the measured mutual capacitance). However, increasing the sample time to increase the ability of the touch sensor to sense a genuine touch (i.e., improve sensitivity) generally increases the response time of the system (i.e., how quickly the touch-sensitive apparatus responds (outputs an indication that a touch is detected) when a touch is first placed on the touch-sensitive apparatus). A balancing of these two considerations is a part of what drives the design of mutual capacitance measurement based touch sensors.

Figure 3:
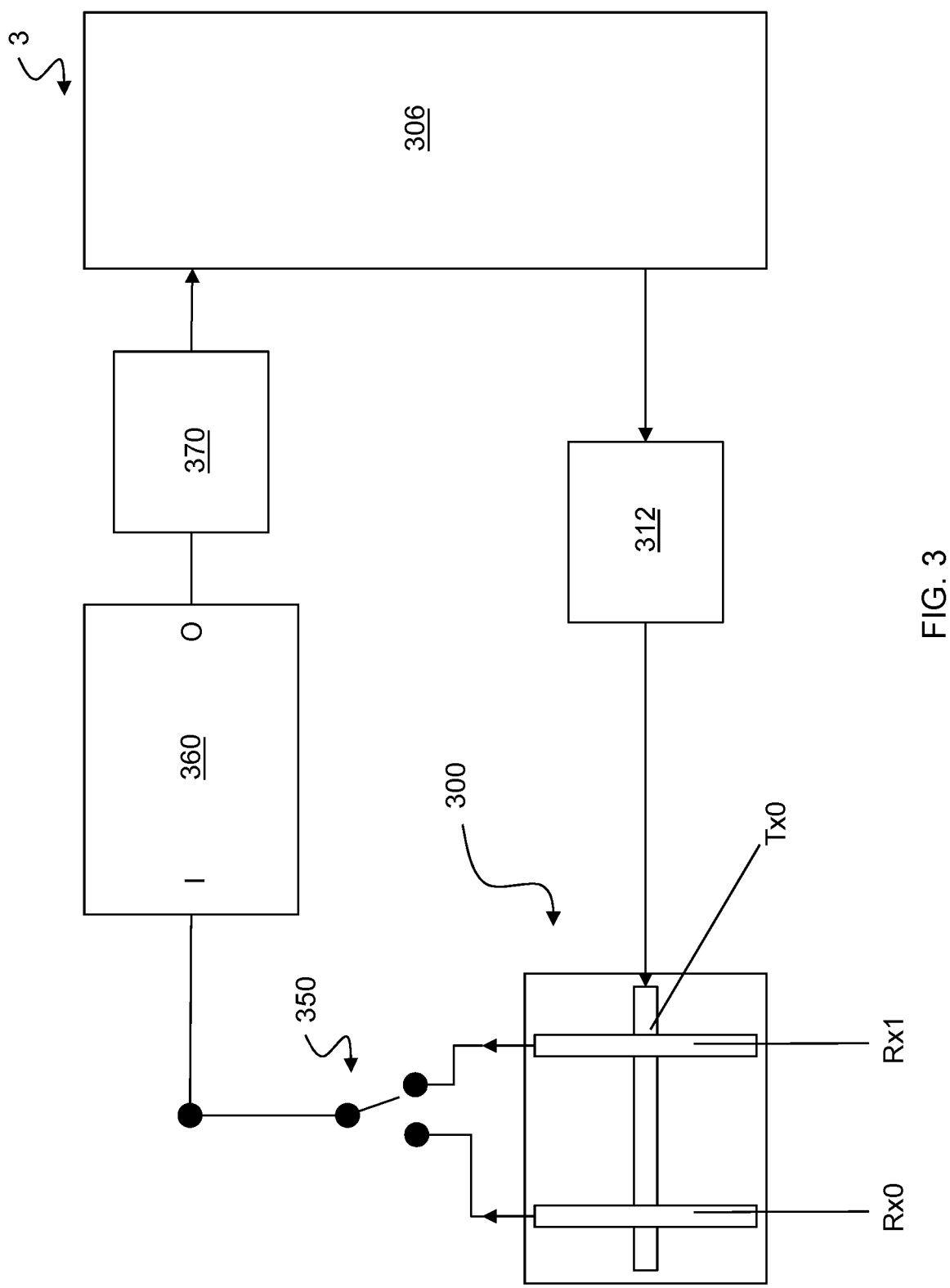
FIG. 3 schematically illustrates an example touch-sensitive apparatus for explaining a conventional approach to sensing capacitances from an electrode array.

FIG. 3 shows an example touch-sensitive apparatus 3 for the purposes of explaining the issues described above. The touch-sensitive apparatus 3 comprises control circuitry 306, drive circuitry 312, switching circuitry 350, sensor element 300, amplifier 360, and analogue to digital converter (ADC) 370.

The drive circuitry 312 is broadly the same as drive circuitry 112 described above in FIGS. 1 and 2 and is configured to generate a drive signal (e.g., a time-varying voltage signal) which is to be applied to a drive electrode of the sensor element 100, under control of the processing circuitry 306.

The sensor element 300 includes a plurality of transmit and receive electrodes. The sensor element 300 is broadly the same as sensor element 100 of FIGS. 1 and 2, and as described may take any suitable physical form and/or comprise any number of electrodes defining a sensing area. For the purposes of explaining the present issues, however, only three electrodes are shown in FIG. 3: a transmit electrode labelled Tx0 (corresponding to one of the X electrodes 101) and two receiver electrodes labelled Rx0 and Rx1 (corresponding to two of the Y electrodes 102).

The apparatus of FIG. 3 further comprises a switching apparatus 350, which receives either of the signals from the first receiver electrode Rx0 or from the second receiver electrode Rx1 and passes the signals to the input I of an amplifier 360. The switching apparatus 350 in FIG. 3 takes the form of a dual input, single output switch which is operated under control of the processing circuitry 306.

The amplifier 360 amplifies the signal received from either of the receiver electrodes Rx0, Rx1, in some instances, converts the signal (e.g., from a current to a voltage), and outputs the amplified signal at the output O of the amplifier 360 to the analogue to digital converter (ADC) 370. The ADC 370 converts the analogue signal (e.g., an analogue voltage signal) to a digital signal using any suitable technique to do so, which is passed to the processing circuitry 306 for further processing/analysis. In this regard, the ADC 370 may be optional and the processing circuitry 306 may be configured to perform further processing/analysis directly on the analogue signal output from the amplifier 360.

Other features which are not directly relevant to the above example are omitted for clarity, but it should be appreciated that components discussed in relation to FIGS. 1 and 2 may be present and/or implemented in the example touch sensitive apparatus 300 of FIG. 3.

Referring back to the electrodes Tx0, Rx0, and Rx1 of FIG. 3, the electrodes are shown as being orthogonal to one another and spatially intersect at different locations in the X-Y plane. The different locations at which the electrodes intersect may be labelled as "intersection point Tx0/Rx0" and "intersection point Tx0/Rx1", respectively. It should be understood that each of the intersection points corresponds to a position in the X-Y plane of the touch-sensitive element. In other words, the intersection points can be translated into two-dimensional Cartesian coordinates on the surface of the touch-sensitive element.

In accordance with the mutual capacitance measurement technique, the transmit electrode Tx0 is driven with a suitable drive signal generated by the drive circuitry 312. To obtain an measure of the mutual capacitance at each of the intersection points (that is, intersection point Tx0/Rx0 and intersection point Tx0/Rx1), the processing circuitry 306 causes the switching apparatus 350 to sequentially connect each of the receiver electrodes Rx0 and Rx1 to the amplifier 360 (and thus indirectly to the processing circuitry 306). Accordingly, each of the receiver electrodes Rx0, Rx1 is coupled to the amplifier 360 and processing circuitry 306 for a certain time period, and for ease of discussion, each of the receiver electrodes are connected for the same time period, denoted here as T. In other words, the time-varying signal output from a given receive electrode Rx0, Rx1, which is indicative of the mutual capacitance at the respective intersection points, is received for a time period of T.

In some practical systems, during the period T when the mutual capacitance of an intersection point is being obtained, the processing circuitry 306 may sample the signal output from the amplifier 360/ADC 370 a plurality of times and determine an average value of the mutual capacitance measurement for that time period T. The signal to noise ratio (that is, the ratio of genuine signal to any noise signal) generally varies as the square root of N, where N is the number of samples of the signal. Assuming that the sampling rate is fixed (that is the number of samples N obtained per second), then the signal to noise ratio varies as the square root of the time period that the signal is obtained for, or using the terminology above, $\sqrt{T}$.

A higher signal to noise ratio is generally desirable to help improve the sensitivity of the touch-sensitive apparatus. In the presence of a touch on or at the sensing surface of the sensor element 300, the mutual capacitance at any of the intersection points differs from a steady state mutual capacitance (i.e., a mutual capacitance measured for that intersection point in the absence of a touch), and more specifically, the measured mutual capacitance for that intersection point decreases relative to the steady state mutual capacitance for that intersection point. A genuine touch at an intersection point can be determined when the difference between the measured mutual capacitance for an intersection point and the steady state mutual capacitance measured for that intersection point differs by at least a threshold amount. In cases where the time period T is short, noise has more of an influence on the calculated mean value of the sampled signal, as compared to when the time period is longer. Therefore, the threshold can be set lower in instances where there is more confidence in the calculated mean value being an actual representation of the measured mutual capacitance (in other words, when the signal to noise ratio is higher). In instances where there is less confidence in the calculated mean value being an actual representation of the signal (when the signal to noise ratio is lower), then the threshold is set relatively higher to avoid instances of noise being determined as a genuine touch.

In the arrangement described by FIG. 3, the mutual capacitance for each intersection point is measured for a total time duration of T. In one complete scan of the sensor element 300 (that is, a measurement of the mutual capacitances of all the intersection points), the total time period for a scan is the time required to measure a single intersection point, T, multiplied by the total number of intersection points. In FIG. 3, this equates to 2T, but of course with more electrodes this time period can end up being quite large in practical systems.

The arrangement in FIG. 3 may be improved to provide a higher signal to noise ratio (higher sensitivity) and/or a quicker time to perform a full scan (quicker response time). Firstly, the arrangement of FIG. 3 may be improved such that each receiver electrode Rx0, Rx1 is provided with a dedicated amplifier 360 (and ADC 370, where necessary). In this case, the individual amplifiers 360 can be connected to the individual receiver electrodes and perform the various measurements in parallel, thus reducing the time required to perform a full scan. However, this leads to an increased cost for the touch-sensitive apparatus 300 and also a much larger footprint for the required circuitry, leading to larger touch-sensitive apparatuses 300. Secondly, the arrangement of FIG. 3 may be improved such that the sampling rate (that is, the number of samples N obtained per second) that the processing circuitry 306 samples the received mutual capacitance signal is set to be higher. This helps improve the signal to noise ratio. However, apparatuses that sample at greater sample rates are often more expensive, have a larger footprint, and/or require more processing power to sample the signal at the higher rate. Additionally, the impedance and bandwidth of the touch-sensitive apparatus 300 may limit the sampling rate, meaning in practical applications, improving the signal-to-noise ratio can only be achieved up to a limit.

Therefore, while solutions exist that enable both a high signal to noise ratio and a quick response time to be realised, these solutions come at elevated costs as well as other disadvantages. When keeping costs low, designers of touch-sensitive systems are left compromising between sensitivity and responsiveness.

In accordance with the present disclosure, the inventors have identified a way to make more efficient use of the mutual capacitance measurement technique to help provide a mutual capacitance measurement with a higher signal to noise ratio relative to the total time required to scan the sensor element.

Figure 4:
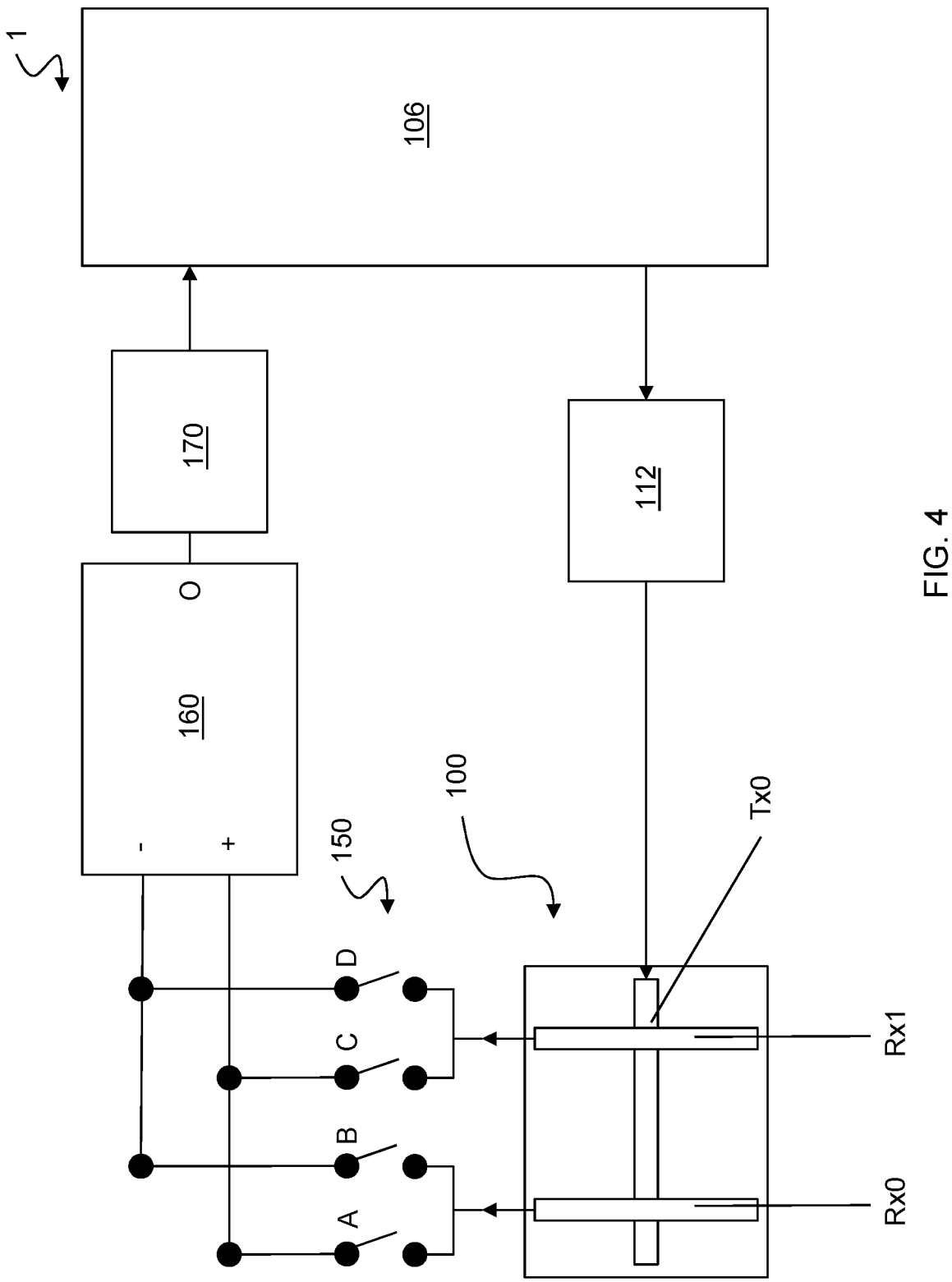
FIG. 4 schematically illustrates a touch-sensitive apparatus for sensing capacitances from an electrode array in accordance with certain embodiments of the invention, where certain electrodes are coupled to inputs of a differential amplifier in accordance with a switching configuration of a switching apparatus at different times.

FIG. 4 is a highly schematic representation of a touch-sensitive apparatus 1 of FIGS. 1 and 2 indicating relevant features in accordance with the present disclosure. The components labelled in FIG. 4 with the same reference signs as used in FIGS. 1 to 2 indicate like components, and a detailed description thereof is omitted. Additionally, it should be appreciated that FIG. 4 highlights components that are relevant for understanding the principles of the present disclosure and certain features of the touch-sensitive apparatus 1 that are shown in FIGS. 1 and 2 are omitted here for conciseness and clarity.

FIG. 4 is based in part of FIG. 3 and shows the touch-sensitive apparatus 1 comprising control circuitry 106, drive circuitry 112, sensor element 100, switching circuitry 150, differential amplifier 160, and analogue to digital converter (ADC) 170.

The touch-sensitive apparatus in FIG. 4 incudes drive circuitry 112 which, as described previously, is configured, under instruction from the processing circuitry 106, to generate a drive signal to be applied to the transmit electrode(s) of the sensor element 100. More specifically, the drive circuitry 112 is configured to generate an analogue, time-varying voltage signal to be applied to the transmit electrode(s). The time-varying voltage signal may be any suitable signal which may be used to sense the mutual capacitance(s) between pairs of electrodes, for example a sinusoidal signal or a square wave signal (providing a series of voltage pulses), the present disclosure is not particularly limited in the nature of the drive signal.

The sensor element 100 in FIG. 3 includes a plurality of electrodes arranged to intersect one another at various locations. More specifically, the sensor element 100 includes at least one transmit electrode and at least two receiver electrodes intersecting the transmit electrode. For the purposes of explaining the present disclosure, only one transmit electrode, labelled Tx0 (corresponding to one of the X electrodes 101), and only two receiver electrodes, labelled Rx0 and Rx1 (corresponding to two of the Y electrodes 102), are shown. However, it should be appreciated the present disclosure may be applied to sensor elements 100 comprising many more transmit and receiver electrodes. In situations where more than one transmit electrode is present, the touch-sensitive apparatus 1 may apply a drive signal either sequentially or in parallel to one or more of the transmit electrodes. The drive signal applied to one drive electrode may be the same or different to the drive signal applied to another drive electrode.

The touch-sensitive apparatus 1 further comprises a switching apparatus 150 which is arranged to couple each of the receive electrodes Rx0, Rx1 to one of multiple inputs of the differential amplifier 160. More specifically, the differential amplifier 160 comprises a first positive (+) input and a second negative (−) input, and the switching apparatus 150 is configured to couple the first receiver electrode Rx0 to one of the first positive (+) input and second negative (−) input using switches A or B and to couple the second receiver electrode Rx1 to one of the first positive (+) input and second negative (−) input using switches C or D. The specific switching configurations at any given time (i.e., which receiver electrodes are connected to which inputs of the differential amplifier 160) is discussed in more detail below. When an analogue time-varying voltage signal generated by the drive circuitry 112 is applied to the transmit electrode Tx0, the time-varying voltage signal causes a corresponding time-varying signal to be generated in one or more of the receiver electrodes Rx0, Rx1. More specifically, an analogue time-varying current signal is produced. The analogue time-varying current signal is indicative of the mutual capacitance between the driven transmit electrode Tx0 and the respective receiver electrode Rx0, Rx1 (or, in other words, the analogue time-varying current signal is indicative of the mutual capacitance at the corresponding intersection points).

The differential amplifier 160 has two inputs: a first positive (+) input and a second negative (−) input and is configured to amplify and output the difference between signals input to the first positive (+) input and the second negative (−) input. The second negative (−) input may be referred to as an inverting input. In this regard, if the same signal is applied to both the first positive (+) input and the second negative (−) input, the second negative (−) inverting input causes the signal to become inverted, while the differential amplifier 160 effectively sums the non-inverted input and the inverted input. Accordingly, when the two input signals at the first and second inputs of the differential amplifier 160 are identical, the output of the differential amplifier (shown at output O in FIG. 4) is approximately zero. (In other words, there is little to no difference between the two input signals). Conversely, when the two input signals are not identical, a non-zero output is output at output O of the differential amplifier 160. The differential amplifier 160 may also convert an input current signal to a voltage output signal.

As in FIG. 3, an optional analogue to digital converter (ADC) 170 may be provided in FIG. 4 which is located between the output of the differential amplifier 160 and the input of the processing circuitry 106. The ADC 170 converts the differential analogue signal output from the differential amplifier 160 (e.g., the time-varying analogue voltage signal) to a digital signal using any suitable technique to do so. The digitised signal is passed to the processing circuitry 106 for further processing/analysis.

In accordance with the principles of the present disclosure, the touch-sensitive apparatus 1 is configured to obtain measurements from each of a plurality of receiver electrodes Rx0, Rx1, offering the potential for an improved signal to noise ratio.

In this regard, the measurement technique according to the present disclosure will now be described.

Under the control of the processing circuitry 106, the drive circuitry 112 is configured to generate and apply a drive signal to the transmit electrode Tx0. The processing circuitry 106 may be configured to cause the drive circuitry 112 to apply the drive signal in response to a particular input (e.g., from a user or from an associated system requesting the sensor element is read) or may cause the drive circuitry 112 to apply the drive signal periodically.

When the drive signal is applied to the transmit electrode Tx0, the processing circuitry 106 is configured to control the switching apparatus 150 to be in a first configuration or a second configuration for a predetermined period of time, which is denoted T herein. For the purposes of comparison, T is the same duration as the time period discussed in relation to FIG. 3. More specifically, the processing circuitry 106 is configured to cause the switching apparatus 150 to be the first configuration for a first time period T1, and to be in the second configuration for a second time period T2.

Figures 5, 6:
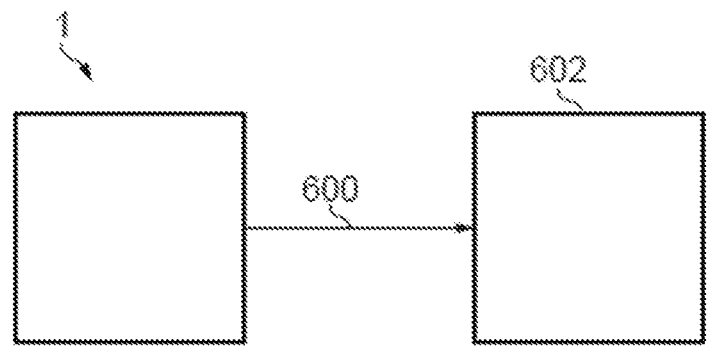
FIG. 5 is a table showing example switching configuration for the switching apparatus of FIG. 4.
FIG. 6 schematically illustrates an example system which employs the touch sensitive apparatus of FIGS. 1 and 4 in accordance with certain embodiments of the invention.

FIG. 5 shows an example table highlighting the configuration of the switches A to D comprising the switching apparatus for the first (and second) time period.

As seen in FIG. 5, for the first time period (Time Period 1, T1), switches A and C of the switching apparatus 150 are closed, while switches B and D of the switching apparatus 150 are open. This configuration of the switching apparatus 150 is called herein the first configuration of the switching apparatus 150. Hence, with reference to FIG. 4, in the first configuration of the switching apparatus 150, the output from the first receiver electrode Rx0 is passed to the first positive (+) input of the differential amplifier 160 and the output from the second receiver electrode Rx1 is also passed to the first positive (+) input of the differential amplifier 160.

Accordingly, in the first configuration of the switching apparatus 150, the signal input to the first positive (+) input of the differential amplifier 160 is the combination of the signal received from the first receiver electrode Rx0 (herein denoted $S_{Rx0}$) and the signal received from the second receiver electrode Rx1 (herein denoted $S_{Rx1}$). Mathematically, the signal input to the first positive (+) input of the differential amplifier 160 when the switching apparatus 150 is in the first configuration, denoted as $S_{+1}$, can be expressed as:

$$S_{+1} = S_{Rx0} + S_{Rx1} \quad (1)$$

Additionally, in the first configuration of the switching apparatus 150, the signal input to the second negative (−) input of the differential amplifier 160 is neither the signal received from the first receiver electrode Rx0 nor the signal received from the second receiver electrode Rx1, or any combination thereof, as the switches B and D of the switching apparatus 150 are open. Although not shown in FIG. 4, the second negative (−) input may be coupled to ground when the switching apparatus 150 is in the first configuration, or to some other reference potential. Mathematically, the signal input to the second negative (−) input of the differential amplifier 160 when the switching apparatus 150 is in the first configuration, denoted as $S_{-1}$, can be expressed as:

$$S_{-1} = S_{REF} \quad (2)$$

where $S_{REF}$ is a reference voltage or ground. For ease of explanation, $S_{REF}$ is herein considered to be zero.

Hence, the signal output from the differential amplifier 160 when the switching apparatus 150 is in the first configuration, denoted $S_{O1}$, is the difference between the signal input to the first positive (+) input of the differential amplifier 160 when the switching apparatus 150 is in the first configuration ($S_{+1}$) and the signal input to the second negative (−) input of the differential amplifier 160 when the switching apparatus 150 is in the first configuration ($S_{-1}$). Mathematically:

$$S_{O1} = S_{+1} - S_{-1} = S_{Rx0} + S_{Rx1} - S_{REF} \quad (3)$$

Referring back to FIG. 5, for the second time period (Time Period 2, T2), switches A and D of the switching apparatus 150 are closed, while switches B and C of the switching apparatus 150 are open. This configuration of the switching apparatus 150 is called herein the second configuration of the switching apparatus 150. Hence, with reference to FIG. 4, in the second configuration of the switching apparatus 150, the output from the first receiver electrode Rx0 is passed to the first positive (+) input of the differential amplifier 160 and the output from the second receiver electrode Rx1 is passed to the second negative (−) input of the differential amplifier 160.

Accordingly, in the second configuration of the switching apparatus 150, the signal input to the first positive (+) input of the differential amplifier 160 is the signal received from the first receiver electrode Rx0 (herein denoted $S_{Rx0}$) and the signal input to the second negative (−) input of the differential amplifier 160 is the signal received from the second receiver electrode Rx1 (herein denoted $S_{Rx1}$). Mathematically, the signal input to the first positive (+) input of the differential amplifier 160 when the switching apparatus 150 is in the second configuration, denoted as $S_{+2}$, can be expressed as:

$$S_{+2} = S_{Rx0} \quad (4)$$

while the signal input to the second negative (−) input of the differential amplifier 160 when the switching apparatus 150 is in the second configuration, denoted as $S_{-2}$, can be expressed as:

$$S_{-2} = S_{Rx1} \quad (5)$$

Hence, the signal output from the differential amplifier 160 when the switching apparatus 150 is in the second configuration, denoted $S_{O2}$, is the difference between the signal input to the first positive (+) input of the differential amplifier 160 when the switching apparatus 150 is in the second configuration ($S_{-2}$) and the signal input to the second negative (−) input of the differential amplifier 160 when the switching apparatus 150 is in the second configuration ($S_{-2}$). Mathematically:

$$S_{O2} = S_{+2} - S_{-2} = S_{Rx0} - S_{Rx1} \qquad (6)$$

As discussed above, the processing circuitry 106 is configured to cause the switching apparatus 150 to be in the first configuration for a first time period, T1, and once the time period T1 has elapsed, to be in the second configuration for a second time period, T2. The processing circuitry 106 receives an output signal from the differential amplifier 160 (or the digitised version of the output from the differential amplifier 160) corresponding to each of the time periods T1 and T2. However, unlike in the scenario described in respect of FIG. 3, both of the output signals received in in the time periods T1 and T2 (that is, signals $S_{O1}$ and $S_{O2}$) contain a component relating to each of the first receiver electrode Rx0 and the second receiver electrode Rx1.

The processing circuitry 106 is configured to obtain the signals indicative of the mutual capacitance of the intersection points Tx0/Rx0 and Tx0/Rx1 using the output signals $S_{O1}$ and $S_{O2}$. More specifically, in response to receiving the output signals $S_{O1}$ and $S_{O2}$ (or the digitised versions thereof), the processing circuitry 106 is configured to calculate the signal indicative of the mutual capacitance of the intersection points Tx0/Rx0 (herein denoted $S_{Tx0/Rx0}$) and Tx0/Rx1 (herein denoted $S_{Tx0/Rx1}$) as follows:

$$S_{Tx0/Rx0} = S_{O1} + S_{O2} = (S_{Rx0} + S_{Rx1}) + (S_{Rx0} - S_{Rx1}) = 2S_{Rx0} \qquad (7)$$

$$S_{Tx0/Rx1} = S_{O1} - S_{O2} = (S_{Rx0} + S_{Rx1}) - (S_{Rx0} - S_{Rx1}) = 2S_{Rx1} \qquad (8)$$

Hence, in accordance with the principles of the present disclosure, the processing circuitry 106 is configured to combine the output signals received from the differential amplifier 160 (or digitised versions thereof) $S_{O1}$ and $S_{O2}$ to arrive at signals indicative of the mutual capacitances at each of the intersection points. However, what is significant here is that, although each signal $S_{O1}$ and $S_{O2}$ is obtained over a time period of T, information regarding the signal sensed on each of the receiver electrodes Rx0 and Rx1 is obtained in each of the signals $S_{O1}$, $S_{O2}$. What this means is that a signal for each receiver electrode is actually obtained over the time period 2T (i.e., twice the time period T corresponding to the period over which each of the signals $S_{O1}$ and $S_{O2}$ are obtained). Thus, effectively the number of samples for a particular intersection point is increased by two in this example without altering the total time required to perform a complete scan of the electrode array. As mentioned, the signal to noise ratio is dependent upon the square root of the number of samples (or the duration over which the measurements are sampled), and thus the processing circuitry 106 of the described implementation is able to provide a roughly √2 increase on the signal to noise ratio for a given signal as compared to the mutual capacitance measurement technique described in FIG. 3.

As mentioned previously, sensitivity (i.e., to ease by which a genuine touch is determined) and responsiveness to a touch (i.e., how quickly a touch is detected) are two characteristics of a touch-sensitive apparatus. In the implementation of FIG. 3, the total scan time (and thus responsiveness) is 2T when the sample time for each receiver electrode is T. However, in the implementation of FIG. 4, the total scan time is also 2T but the sample time for each receiver electrode Rx0, Rx1 is increased to 2T, as discussed above. Thus, assuming a constant sample rate, the sensitivity of the touch-sensitive apparatus 1 is improved in accordance with the technique described in FIG. 4 while maintaining the same level of responsiveness as compared to the implementation of the touch-sensitive apparatus 3 in FIG. 3. Alternatively, one may instead set the time period for obtaining each signal $S_{O1}$ and $S_{O2}$ shorter to T/2, thus meaning that each receiver electrode Rx0, Rx1 is sampled over an equivalent period of T in accordance with the technique described in FIG. 4. This provides a similar signal to noise ratio, and thus sensitivity, as in the implementation of FIG. 3 because the number of samples N for each receiver electrode is similar under both methods. However, the total time required to scan all the receiver electrodes is T in the implementation of FIG. 4, and thus, the responsiveness of the touch sensitive apparatus 1 can be improved while maintaining a similar level of sensitivity. It should be appreciated that both sensitivity and responsiveness may be improved by setting the time period to a value between T/2 and T.

It should be appreciated that while the implementation of FIG. 4 shows only two receiver electrodes Rx0, Rx1, the principles of the present disclosure may be applied to sensor elements 100 comprising additional receiver electrodes. For example, the sensor element 100 may comprise an additional pair of receiver electrodes which intersect the transmit electrode Tx0. The additional pair of receiver electrodes may be provided with a corresponding switching apparatus 150 and associated differential amplifier 160. Accordingly, when the drive signal is applied to the transmit electrode Tx0, the processing circuitry is configured to operate the switching apparatuses 150 in the corresponding manner as described above for each pair of the receiver electrodes (with Rx0 and Rx1 constituting a first pair and the additional pair of receiver electrodes constituting a second pair). More broadly, the principles of the present disclosure may be applied to groups of receiver electrodes (e.g., pairs) with each group comprising an associated switching apparatus 150 and differential amplifier 160.

In addition, it should be appreciated that the principles of the present disclosure may be applied to arrangements having multiple transmit electrodes. In such arrangements, the processing circuitry 106 may be configured to sequentially apply the drive signal to each of the transmit electrodes. During each period when a transmit electrode is being driven, the processing circuitry 106 operates the switching apparatus 150 as described above and obtains measurements from each of the receiver electrodes coupled to the transmit electrode that is being driven. Once the signals have been obtained for a given transmit electrode, the processing circuitry 106 causes the drive signal to be applied to a further drive electrode and the switching apparatus 150 is controlled as described above to obtain measurements from the receiver electrodes coupled to the further drive electrode. In such arrangements, the time required to scan the electrode array increases in proportion to the number of transmit electrodes. In other implementations, the processing circuitry 106 may be arranged to drive a plurality of transmit electrodes simultaneously and use the switching apparatus to obtain signals indicative of the receiver electrode coupled to the first and further electrodes simultaneously.

In addition, it should be appreciated that the switching apparatus 150 shown in FIG. 4 is an example of the switching apparatus 150 only and different configurations of the switching apparatus 150 may be realised in accordance with the specific implementation at hand. For instance, in FIG. 4, the receiver electrode Rx0 is coupled to the first positive (+) input of the differential amplifier 160 in both the first configuration and the second configuration. Accordingly, switches A and B may be omitted from the switching apparatus 150 and instead be replaced with a direct connection to the first positive (+) input of the differential amplifier 160. Depending on the specific combinations of the signals sensed by the receiver electrodes required, the switching apparatus 150 may be adapted accordingly. Furthermore, any suitable switch may be used in the switching apparatus 150 provided the switch may be controlled by the processing circuitry 106. By way of example, each switch of the switching apparatus 150 may be a transistor, such as a field effect transistor (FET), but other suitable switches may be used.

The processing circuitry 106, once the signals $S_{Tx0/Rx0}$ and $S_{Tx0/Rx1}$ have been calculated, can be compared to a threshold to determine whether a touch 109 on the touch sensitive element has been detected the respective intersection points. For example, the processing circuitry 106 in the present implementation is configured to determine a change in mutual capacitance at an intersection point by calculating the difference between the measured value of the mutual capacitance at the intersection point and a baseline value of the mutual capacitance obtained for the intersection point in the absence of a touch obtained in advance. That is, the processing circuitry may subtract the signal $S_{Tx0/Rx0}$ obtained in equation (7) (or an average thereof) from an expected signal of $S_{Tx0/Rx0}$ obtained in the absence of a touch (or an average thereof) and compare the difference to a predefined threshold. If the difference is greater than the predefined threshold, then the processing circuitry 106 may output a signal indicating the presence of a touch on the touch-sensitive element. The output signal may either be an indication that a touch is detected, or it may include the location (e.g., X-Y coordinates) of the detected touch on the touch sensitive element corresponding to the specific intersection point(s). In some instances, the signal may include multiple locations corresponding to multiple detected touches.

FIG. 6 is a highly schematic diagram showing the touch sensitive apparatus 1 coupled to an associated apparatus 602. The associated apparatus 602 generally comprises a computer processor which is capable of running a software application, and may also comprise a display element, such as an LCD screen or the like. In some implementations, the touch sensitive apparatus 1 is integrally formed with the associated apparatus 602, whereas in other implementations the touch sensitive apparatus 1 is able to be coupled to the associated apparatus 602 e.g., via electrical cabling. As described above, in some instances the substrate 103 and cover 108 of the touch sensitive apparatus 1 are transparent and a display element is placed behind the substrate 103 and cover 108, such as in a smartphone.

The touch sensitive apparatus 1 functions as an input mechanism for the associated apparatus 602. As mentioned, the processing circuitry 106 outputs a signal 600 indicating the presence of a touch on the touch-sensitive element to the processing circuitry of the associated apparatus (not shown). In some applications, signal 600 may simply indicate whether or not a genuine touch has been detected on the touch-sensitive element, whereas in other instances, the signal 600 may indicate one or more positions of the touch or touches on the touch-sensitive element, for example as X, Y coordinates (corresponding to the intersection points). The processing circuitry of the associated apparatus 602 may process the signal 600 in accordance with the application being run on the associated apparatus, e.g., by causing the associated apparatus to perform an action or change the image(s) that is displayed on the display unit.

Thus, the present disclosure relates to a touch-sensitive apparatus in which a differential amplifier having a first input and a second input is provided that each couple to first and second receiver electrodes using different configurations of a switching apparatus at a first time period and a second time period. This operation allows signals to be received which are various, orthogonal, combinations of the individual signals indicative of the capacitance sensed by each of the receiver electrodes. By processing the signals accordingly, the processing circuitry can obtain an indication of the capacitances for a given receiver electrode over both the first and second time period, thus effectively increasing the time for which each receiver electrode is sensed for (and thus increasing the number of samples of the signals sensed by each receiver electrode). This may be used to help improve the signal to noise ratio and/or the responsiveness of the touch-sensitive apparatus without the need for more expensive, larger components, thus keeping the cost and size of the touch sensitive apparatus 1 down.

As described above, the arrangement of FIG. 4 in some implementations may be applied to groups (pairs) of receiver electrodes where each pair is coupled to a respective switching apparatus 150 and differential amplifier 160. However, the principles of the present disclosure may be applied to arrangements where there are an odd number of receiver electrodes.

Figure 7:
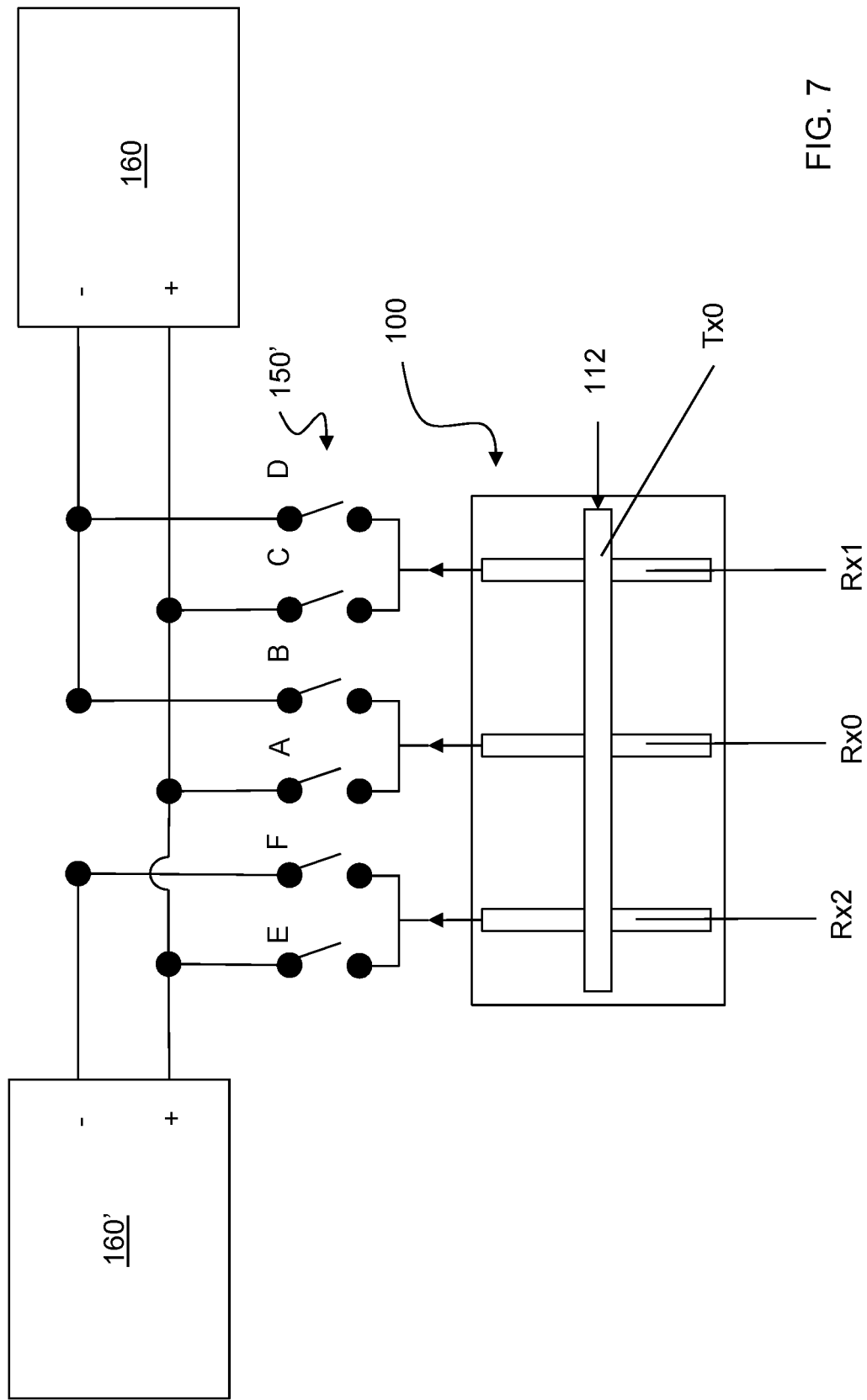
FIG. 7 shows a modification of the touch-sensitive apparatus of FIG. 4 adapted to measure an electrode array having an odd number of electrodes.

FIG. 7 schematically shows a modification to the arrangement shown in FIG. 4. In FIG. 7, an additional third receiver electrode, Rx2, is shown intersecting the transmit electrode Tx0. The switching apparatus 150' is modified from switching apparatus 150 of FIG. 4 to include an additional pair of switches E and F which respectively couple the third receiver electrode Rx2 to either the first positive (+) input of an additional differential amplifier 160' or to the second negative (+) input of the additional differential amplifier 160'. One further change is made to the switching apparatus 150' and that is that the signal line connecting switch A to the first positive (+) input of the differential amplifier 160 is also coupled to the first positive input (+) of the additional differential amplifier 160'. Other components which are present in FIG. 4 are not shown for the purposes of clarity and conciseness.

In this arrangement, when the switching apparatus 150' is in the first configuration, switches A and C are closed while switches B and D are open, as described in FIG. 4. Additionally, switch E is also closed such that the output from the third receiver electrode Rx2 is passed to the first positive (+) input of the additional differential amplifier 160', while switch F is open. The switching arrangement 150' is shown in a simplified manner in FIG. 7, but additional circuitry/components may be present which allow for the output from the first receiver electrode Rx0 and the output from the second receiver electrode Rx1 to be passed to the first positive (+) input of the differential amplifier 160, and the output from the third receiver electrode Rx2 and the output from the first receiver electrode Rx0 to be passed to the first positive (+) input of the additional differential amplifier 160'. For example, filter circuitry (e.g., which may include one or more diodes) can be provided to prevent the output from the second receiver electrode Rx2 from being passed to the first positive (+) input of the additional differential amplifier 160' and the output from the third receiver electrode Rx2 from being passed to the first positive (+) input of the differential amplifier 160.

Thus, mathematically, the signal input to the first positive (+) input of the differential amplifier 160 when the switching apparatus 150' is in the first configuration, denoted as $S_{+1}$, can be expressed as in equation (1) above, while the input to the first positive (+) input of the additional differential amplifier 160' when the switching apparatus 150' is in the first configuration, denoted as $S'_{+1}$, can be expressed as:

$$S'_{+1} = S_{Rx0} + S_{Rx2} \quad (9)$$

As with the differential amplifier 160, the second negative (−) input of the additional differential amplifier 160' may be coupled to ground or another reference voltage, but for the purposes of this discussion, is considered to be zero. Accordingly, the signal output from the additional differential amplifier 160' when the switching apparatus 150' is in the first configuration, denoted $S'_{O1}$, is the difference between the signal input to the first positive (+) input of the additional differential amplifier 160' when the switching apparatus 150' is in the first configuration ($S'_{+1}$) and the signal input to the second negative (−) input of the additional differential amplifier 160' when the switching apparatus 150' is in the first configuration (denote here as $S'_{-1}$, but is considered to be zero). Mathematically:

$$S'_{O1} = S''_{+1} - S'_{-1} = S_{Rx0} + S_{Rx2} \quad (10)$$

Further, when the switching apparatus 150' is controlled to be in the second configuration, switches A and D are closed while switches B and C are open, as described in FIG. 4. Additionally, switch F is closed such that the output from the third receiver electrode Rx2 is passed to the second negative (−) input of the additional differential amplifier 160', while switch E is open.

Thus, mathematically, the signal input to the first positive (+) input of the differential amplifier 160 when the switching apparatus 150' is in the second configuration, denoted as $S_{+2}$, can be expressed as in equation (4) above, while the input to the first positive (+) input of the additional differential amplifier 160' when the switching apparatus 150' is in the first configuration, denoted as $S'+2$, is the output from the first receiver electrode Rx0, and can be expressed as:

$$S'_{+2} = S_{Rx0} \quad (11)$$

Equally, when the switching apparatus 150' is controlled to be in the second configuration, the input to the second negative (−) input of the differential amplifier 160 when the switching apparatus 150' is in the second configuration, denoted as $S_{-2}$, can be expressed as in equation (5), while the input to the second negative (−) input of the additional differential amplifier 160' when the switching apparatus 150' is in the second configuration, $S'_{-2}$, is the signal output from the first receiver electrode, $S_{Rx2}$, or mathematically, $$S'_{-2} = S_{Rx2} \quad (12)$$

Accordingly, the signal output from the differential amplifier 160 when the switching apparatus 150' is in the first configuration, $S_{O1}$, and the signal output from the differential amplifier 160 when the switching apparatus 150' is in the second configuration, $S_{O2}$, are broadly the same as described in FIG. 4 and as set out in equations (3) and (6). In a similar manner, the signal output from the additional differential amplifier 160' when the switching apparatus 150' is in the first configuration, $S'_{O1}$, and the signal output from the additional differential amplifier 160' when the switching apparatus 150' is in the second configuration, $S'_{O2}$, can be mathematically expressed as:

$$S'_{O1} = S'_{+1} - S'_{-1} = S_{Rx0} + S_{Rx2} - S_{REF} \quad (13)$$

$$S'_{O2} = S'_{+2} - S'_{-2} = S_{Rx0} - S_{Rx2} \quad (14)$$

Hence, in a similar manner as described in relation to FIG. 4, to obtain an indication of the signal indicative of the mutual capacitance of the intersection point Tx0/Rx2 the processing circuitry 106 (which may receive the outputs from both differential amplifiers 160, 160') uses the output signals $S'_{O1}$ and $S'_{O2}$. More specifically, in response to receiving the output signals $S'_{O1}$ and $S'_{O2}$ (or digitised versions thereof), the processing circuitry 106 is configured to calculate the signal indicative of the mutual capacitance of the intersection point Tx0/Rx2 (herein denoted $S_{Tx0/Rx2}$) as follows:

$$S_{Tx0/Rx2} = S'_{O1} - S'_{O2} = (S_{Rx0} + S_{Rx2}) - (S_{Rx0} - S_{Rx2}) = 2S_{Rx2} \quad (15)$$

The processing circuitry 106 is configured to calculate the signal indicative of the mutual capacitance of the intersection points Tx0/Rx0 and Tx0/Rx1 using equations (7) and (8) above.

Therefore, broadly speaking, the principles of the present disclosure can be extended to arrangements of the electrodes where an odd number of receiver electrodes are present in the sensor element 100. In this regard, the techniques discussed in FIG. 4 are essentially applied to two groups of receiver electrodes but the groups themselves overlap (that is, at least one receiver electrode is contained in both a first group and a second group). The techniques described in FIG. 4 are then essentially applied to the receiver electrodes of each group respectively to generate the appropriate signals. It should be appreciated that FIG. 7 is provided to demonstrate the principles of how the techniques of FIG. 4 may be extended to systems where there are an odd number of receiver electrodes. Practically speaking, the solution shown in FIG. 7 may not be the ideal solution for the arrangement shown as in, principle, the third receiver electrode could simply be coupled to a single conventional amplifier independently of the switching apparatus 150' to provide a signal indicative of the mutual capacitance at the intersection point Tx0/Rx2. However, in other arrangements of the electrode array, the principles described in FIG. 7 may be more applicable.

Additionally, while the technique described above in relation to FIG. 4 and FIG. 5 has been described with respect to two receiver electrodes, receiver electrodes Rx0 and Rx1, the technique can be applied to any group of receiver electrodes comprising any number of receiver electrodes, e.g., 4, 6, etc. Suitable algorithms for connecting the receiver electrodes to the differential amplifier 160 and processing the received signals can be adopted depending on the number of receiver electrodes within the group of receiver electrodes.

Figure 8:
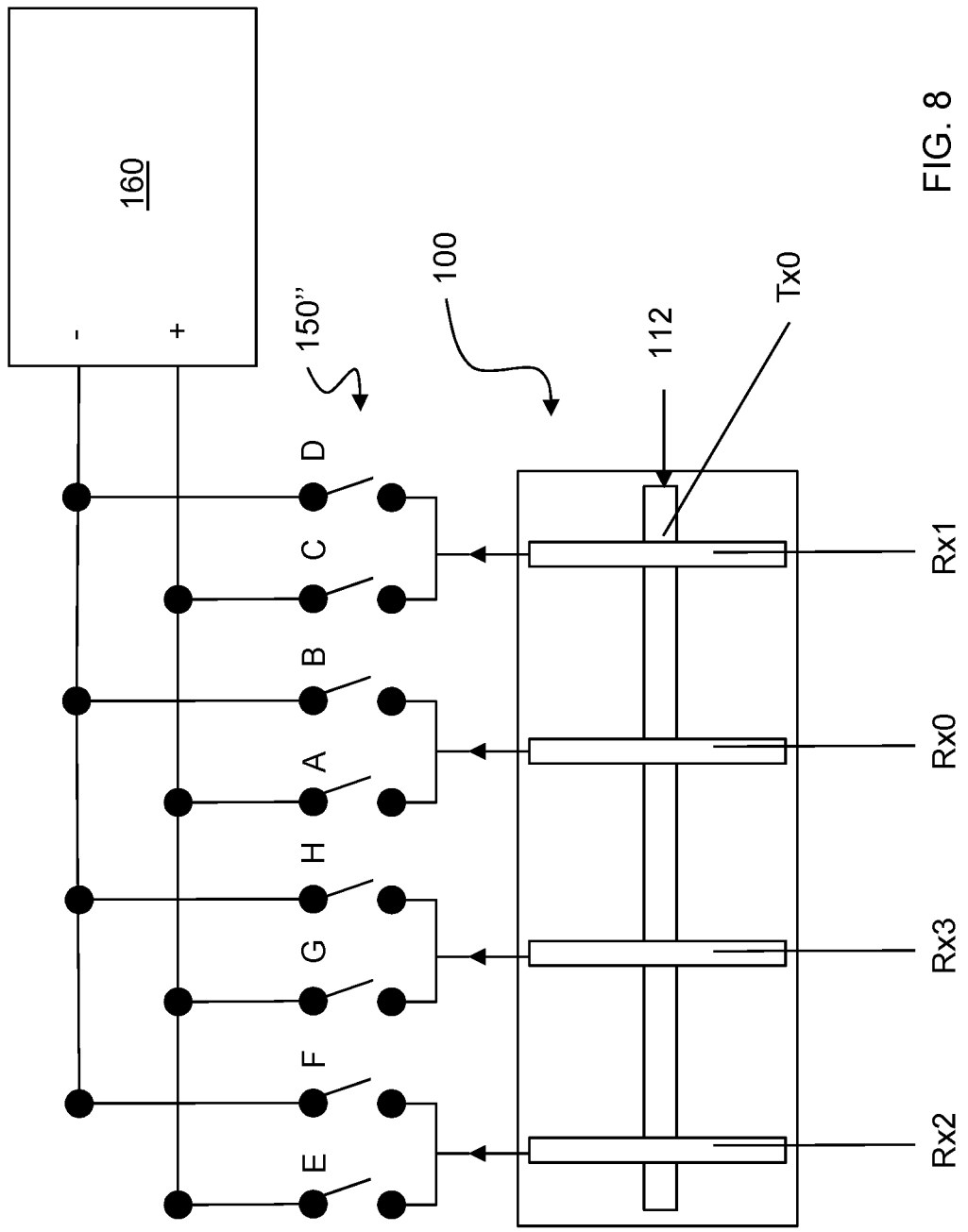
FIG. 8 shows a modification of the touch-sensitive apparatus of FIG. 4 adapted to measure an electrode array having greater than two electrodes coupled to the differential amplifier.

FIG. 8 illustrates an example extending the principles of the present disclosure to a system comprising a group of four receiver electrodes. The sensor element 100 of FIG. 8 shows receiver electrodes Rx0 and Rx1 as before, but additionally shows receiver electrodes Rx2 and Rx3, which also intersect transmit electrode Tx0.

The switching apparatus 150" is similar to switching apparatus 150 of FIG. 4 but additionally includes switches E, F, G, and H. Switches E and F respectively allow the output of the third receiver electrode Rx2 to be coupled to the first positive (+) input of the differential amplifier 160 and to the second negative (−) input of the differential amplifier 160, while switches G and H respectively allow the output of the fourth receiver electrode Rx3 to be coupled to the first positive (+) input of the differential amplifier 160 and to the second negative (−) input of the differential amplifier 160.

In the arrangement of FIG. 4, the first and second switching configurations can essentially be codified using a number or sign representing each receiver electrode. For instance, the code (+1, +1) represents the first switching configuration and signifies that the first receiver electrode Rx0 is coupled to the first positive (+) input of the differential amplifier 160 and the second receiver electrode Rx1 is also coupled to the first positive (+) input of the differential amplifier 160. Conversely, the code (+1, −1) represents the second switching configuration and signifies that the first receiver electrode Rx0 is coupled to the first positive (+) input of the differential amplifier 160 and the second receiver electrode Rx1 is also coupled to the second negative (−) input of the differential amplifier 160.

In the arrangement of FIG. 8, each switching configuration can be codified using a four number sequence/coordinate representing the connection of the respective receiver electrode to the positive or negative input of the differential amplifier 160.

In order to obtain the appropriate signals to obtain a signal having an indication of the mutual capacitance at each of the intersection points Tx0/Rx0, Tx0/Rx1, Tx0/Rx2, and Tx0/Rx3, the processing circuitry 106 is configured to cause the switching apparatus 150″ to sequentially take a first, second, third and fourth configuration each for a duration of time (e.g., T). During each of the respective time periods, the processing circuitry 106 is configured to obtain signals in a similar manner as described in FIG. 4. In terms of the switching configurations, the switching configurations can be represented as:

First Switching Configuration=(+1,+1,+1,−1)

Second Switching Configuration=(+1,+1,−1,+1)

Third Switching Configuration=(+1,−1,+1,+1)

Fourth Switching Configuration=(−1,+1,+1,+1)  (16)

Broadly speaking, in each of the switching configurations, one of the receiver electrodes is connected to the negative (−) input of the differential amplifier 160 while the remaining receiver electrodes are coupled to the positive (+) input of the differential amplifier.

For each of the switching configurations above, the output signal output by the 30 differential amplifier, which is the difference between the signal at the positive input and the signal at the negative input of the differential amplifier, can be represented mathematically as:

$$S_{O1}=S_{Rx0}+S_{Rx1}+S_{Rx2}-S_{Rx3} \quad (17)$$

$$S_{O2}=S_{Rx0}+S_{Rx1}-S_{Rx2}+S_{Rx3} \quad (18)$$

$$S_{O3}=S_{Rx0}-S_{Rx1}+S_{Rx2}+S_{Rx3} \quad (19)$$

$$S_{O4}=-S_{Rx0}+S_{Rx1}+S_{Rx1}+S_{Rx3} \quad (20)$$

where $S_{On}$ represents the signal output from the differential amplifier 160 when the switching configuration is n, where n may signify the first (1), second (2), third (3) or fourth (4) switching configuration. Equally, for the purposes of this discussion, n may also represent the time period T—that is, the processing circuitry is configured to cause the switching apparatus 150″ to be in the first configuration for a time period T1, cause the switching apparatus 150″ to be in the second configuration for a time period T2, etc.

Accordingly, and in a similar manner to that described in relation to FIG. 4, the processing circuitry 106 is configured to obtain the signals indicative of the mutual capacitance of the intersection points Tx0/Rx0, Tx0/Rx1, Tx0/Rx2, Tx0/Rx3 using the output signals $S_{O1}$, $S_{O2}$, $S_{O3}$, and $S_{O4}$. More specifically, in response to receiving the output signals $S_{O1}$ to $S_{O4}$ (or digitised versions thereof), the processing circuitry 106 is configured to calculate the signal indicative of the mutual capacitance of the intersection points Tx0/Rx0 (herein denoted $S_{Tx0/Rx0}$), Tx0/Rx1 (herein denoted $S_{Tx0/Rx1}$), Tx0/Rx2 (herein denoted $S_{Tx0/Rx2}$), and Tx0/Rx3 (herein denoted $S_{Tx0/Rx3}$) as follows:

$$S_{Tx0/Rx0}=S_{O1}+S_{O2}+S_{O3}-S_{O4}=4S_{Rx0} \quad (21)$$

$$S_{Tx0/Rx1}=S_{O1}+S_{O2}-S_{O3}+S_{O4}=4S_{Rx1} \quad (22)$$

$$S_{Tx0/Rx2}=S_{O1}-S_{O2}+S_{O3}+S_{O4}=4S_{Rx2} \quad (23)$$

$$S_{Tx0/Rx3}=-S_{O1}+S_{O2}+S_{O3}+S_{O4}=4S_{Rx3} \quad (24)$$

Hence, in a similar manner to that discussed in accordance with FIG. 4, the processing circuitry 106 is configured to combine the output signals received from the differential amplifier 160 (or digitised versions thereof) $S_{O1}$ to $S_{O4}$ to arrive at signals indicative of the mutual capacitances at each of the four intersection points Tx0/Rx0, Tx0/Rx1, Tx0/Rx2, and Tx0/Rx3. As before, a balance may be struck between the signal to noise ratio and the responsiveness of the touch-sensitive apparatus, allowing the touch-sensitive apparatus 1 to improve one or both of these characteristics relative to a system that sequentially measures each intersection point. In this case, if each signal $S_{O1}$ to $S_{O4}$ is obtained for a period of T, then the signal to noise ratio is improved by two as compared to the sequential example. Alternatively, if each signal $S_{O1}$ to $S_{O4}$ is obtained for a period of T/4, the responsiveness is improved without impacting the sensitivity.

Figure 9A:
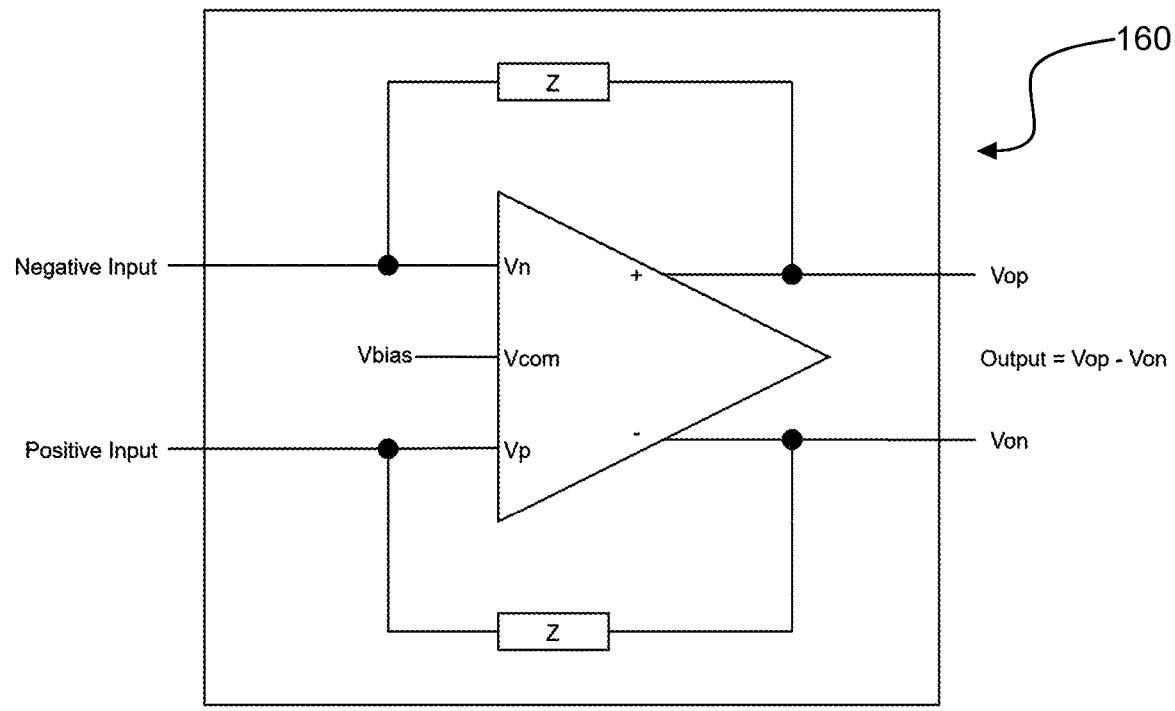
FIGS. 9a and 9b schematically illustrate examples of different differential amplifiers that may be used in the touch-sensitive apparatus according to the present disclosure, where
Figure 9B:
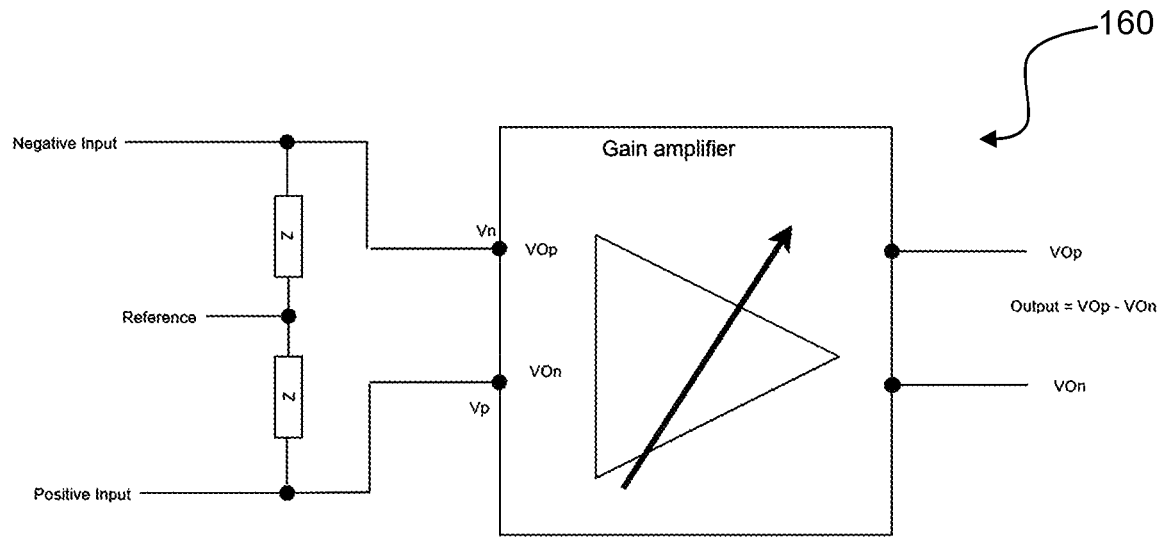

It has been described that the touch-sensitive apparatus 1 of the present disclosure comprises a differential amplifier 160. Any suitable differential amplifier may be used in accordance with the principles described above. FIGS. 9a and 9b illustrate two examples of differential amplifiers that may be employed in the touch-sensitive apparatus 1 described above.

FIG. 9a schematically illustrates a transimpedance amplifier (TIA) as the differential amplifier 160. FIG. 9a shows the main features of a transimpedance amplifier but it will be appreciated that other details (for example the specific electrical connections within the amplifier) are not shown. For more details on the construction of transimpedance amplifiers, the reader is referred to any number of standard electrical textbooks.

The TIA 160 of FIG. 9a includes two signal input terminals, labelled "Vp" (positive) and "Vn" (negative). The two input terminals correspond to the first positive (+) input and second negative (−) input of the differential amplifier 160 of FIG. 4 and are therefore configured to selectively receive at least the output from the receiver electrodes Rx0, Rx1 as described above. The TIA 160 is configured to receive a current signal from the receiver electrodes Rx0, Rx1 and convert the current signal to a voltage signal. Hence, as described above, the TIA 160 is a voltage amplifier.

The TIA 160 also comprises a third signal input terminal, denoted $V_{COM}$. Input to the third signal input terminal of the TIA 160 is a bias voltage which may be referred to as a common mode voltage. The common mode voltage (or more generally signal) provides a voltage about which the output signals of the TIA 160 are provided. The bias voltage may be any suitable signal, e.g., a fixed or time-varying signal. When operating in the mutual capacitance measurement mode, the bias voltage is a fixed voltage (and may be a static DC voltage, a virtual earth or a variable but fixed reference voltage). The bias voltage may be set to reduce a common component common to the signals received at each of the positive input and negative input of the TIA.

The TIA 160 further comprises two output terminals, denoted herein as the negative (−) output terminal and the positive (+) output terminal. In FIG. 9a, the terminals are shown as outputting signals Vop and Von. The signals Vop and Von are effectively signals that represent the variation of the input received at the positive input terminal with respect to the bias signal received at the input Vcom and the variation of the input received at the negative input terminal with respect to the bias signal received at the input Vcom. The TIA 160 is configured to subtract the output signal Von from the output signal Vop to provide a single output signal (denoted Output in FIG. 9a) from the TIA 160, which is essentially representative of the signals $S_{oN}$ described previously, where N is the specific switching configuration of the switching apparatus 150, as described above.

Also shown in FIG. 9a are loops comprising a resistor Z which couple respective inputs and outputs as seen in FIG. 9a. Broadly speaking, the resistor Z plays a part in the gain of the TIA 160, and for a given loop, the gain is equal to Z/Rx (where Rx is the resistance on the various input signal lines). The resistance Rx may be a physical resistor and/or a representation of the collective resistances on the input signal line. The loops on either side of the TIA 160 are preferably matched (that is, the values of Z are the same on both loops) to avoid second (and higher) order harmonics during the feedback of the voltage signals.

FIG. 9b schematically illustrates a standard gain amplifier or instrument amplifier (GA/IA) as the differential amplifier 160. FIG. 9b shows the main features of a standard instrument amplifier but it will be appreciated that other details (for example the specific electrical connections within the amplifier) are not shown. For more details on the construction of instrument amplifiers, the reader is referred to any number of standard electrical textbooks.

The IA 160 of FIG. 9b includes two signal input terminals, labelled "Vp" (positive) and "Vn" (negative). The two input terminals correspond to the first positive (+) input and second negative (−) input of the differential amplifier 160 of FIG. 4 and are therefore configured to selectively receive at least the output from the receiver electrodes Rx0, Rx1 as described above. The instrument amplifier 160 is configured to receive a current signal from the receiver electrodes Rx0, Rx1 and convert the current signal to a voltage signal. Hence, as described above, the instrument amplifier 160 is a voltage amplifier.

Unlike the TIA 160, the instrument amplifier does not comprise a bias voltage terminal. Instead, a reference or bias voltage is provided to the two input signals using a resistors Z coupled in parallel to the input signal lines with the reference voltage (denoted "Reference" in FIG. 9b). The reference voltage acts in a similar manner to the bias voltage as described in respect of the TIA 160 in FIG. 9a.

The instrument amplifier 160 further comprises two output terminals, denoted herein as the negative (−) output terminal and the positive (+) output terminal. In FIG. 9b, the terminals are shown as outputting signals Vop and Von. The signals Vop and Von are effectively signals that represent the variation of the input received at the positive input terminal with respect to the bias signal and the variation of the input received at the negative input terminal with respect to the bias signal. The instrument amplifier 160 is configured to subtract the output signal Von from the output signal Vop to provide a single output signal (denoted Output in FIG. 9b) from the instrument amplifier 160, which is essentially representative of the signals $S_{oN}$ described previously, where N is the specific switching configuration of the switching apparatus 150, as described above.

Figure 10:
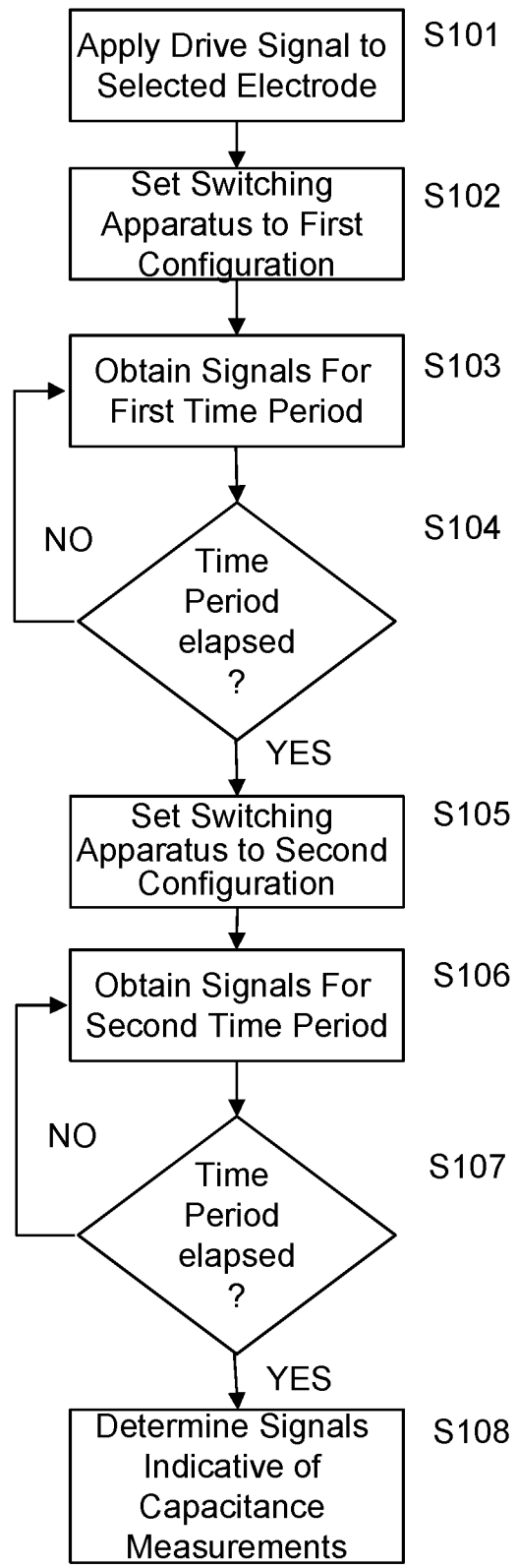
FIG. 10 is a flow diagram illustrating an example method for operating the touch-sensitive apparatus of FIG. 1.

FIG. 10 represents an example method for determining operating a touch sensitive apparatus 1 in accordance with the principles of the present disclosure.

The method begins at step S101 where drive circuitry 112, under control of the processing circuitry 106, applies the drive signal to a selected electrode. The selected electrode may be the transmit electrode Tx0 of FIG. 4.

At step S102, the processing circuitry 106 causes the switching apparatus 150 to be in the first configuration. As discussed above, in the context of FIG. 4, this may include switches A and C being closed with switches B and D being open to couple the first and second receiver electrodes to the first positive (+) input of the differential amplifier 160.

At step S103, the processing circuitry 106 causes the touch-sensitive apparatus 1 to produce signals indicative of the capacitance as sensed according to the first switching configuration of the switching apparatus 150. The processing circuitry 106 causes the signals (e.g., $S_{+1}$, $S_{−1}$) to be obtained for a first time period, e.g., T, as described. Accordingly, at step S104, the processing circuitry 106 is configured to identify whether the first time period has elapsed (and thus whether the signals indicative of the capacitance sensed by the first and second receiver electrodes are appropriately obtained). If step S104 is answered in the negative (i.e., a "NO" at step S104), the method proceeds back to step S103 and the switching apparatus 150 is maintained in the first configuration until the time T has elapsed. The processing circuitry 106 may receive the instantaneous output (e.g., $S_{O1}$) from the differential amplifier 160 while steps S103 or S104 are taking place, or the processing circuitry 106 may receive the output (e.g., $SO_1$) from the differential amplifier 160 once the time period has elapsed (i.e., a "YES" at step S104).

Once the first time period has elapsed at step S104, i.e., step S104 is answered in the affirmative, the method proceeds to step S105 where the processing circuitry 106 causes the switching apparatus 150 to be in the second configuration. As discussed above, in the context of FIG. 4, this may include switches A and D being closed with switches B and C being open to couple the first receiver electrode to the first positive (+) input of the differential amplifier 160 and the second receiver electrode to the second negative (−) input of the differential amplifier 160.

At step S106, the processing circuitry 106 causes the touch-sensitive apparatus 1 to produce signals indicative of the capacitance as sensed according to the second switching configuration of the switching apparatus 150. The processing circuitry 106 causes the signals (e.g., $S_{+2}$, $S_{−2}$) to be obtained for a second time period, e.g., T, as described. The second time period is set to be equal in duration to the first time period. Accordingly, at step S107, the processing circuitry 106 is configured to identify whether the second time period has elapsed (and thus whether the signals indicative of the capacitance sensed by the first and second receiver electrodes are appropriately obtained). If step S107 is answered in the negative (i.e., a "NO" at step S107), the method proceeds back to step S106 and the switching apparatus 150 is maintained in the second configuration until the second time T has elapsed. The processing circuitry 106 may receive the instantaneous output (e.g., $SO_2$) from the differential amplifier 160 while steps S106 or S107 are taking place, or the processing circuitry 106 may receive the output (e.g., $S_{O2}$) from the differential amplifier 160 once the second time period has elapsed (i.e., a "YES" at step S107).

Once the second time period has elapsed at step S107, i.e., step S107 is answered in the affirmative, the method proceeds to step S108 where the processing circuitry 106 is configured to determine signals indicative of the capacitance as sensed by the first and second receiver electrodes Rx0, Rx1. More specifically, in the context of FIG. 4, the processing circuitry 106 is configured to determine signals indicative of the mutual capacitance as sensed by the first and second receiver electrodes with respect to the transmit electrode Tx0 (that is, the mutual capacitance of intersection points Tx0/Rx0 and Tx0/Rx1). The processing circuitry 106 may take the signals $SO_1$ and $S_{O2}$ obtained at steps S102/S103 and S106/S107 and calculate the mutual capacitances above using equations (7) and (8) to provide signals indicative of the mutual capacitance of intersection points Tx0/Rx0 and Tx0/Rx1. At this stage, the processing circuitry 106 may output a signal indicating the presence of a touch at any one or both of the intersection points Tx0/Rx0 and Tx0/Rx1 if the mutual capacitance (or signal indicative of the mutual capacitance) deviates from an expected value by a predetermined amount.

Although FIG. 10 shows the method ending after step S108, the method may proceed back to step S101 where the drive signal is applied to a different selected electrode (e.g., the next transmit electrode). The method may be repeated until all electrodes that are to be driven (e.g., all of the transmit electrodes of the electrode array) have been driven and measurements of the relevant capacitances have been obtained. This forms one complete scan of the electrode array. At this point, the process may return to the first electrode that was driven and the method repeated over to perform a second (or further) scan.

Additionally, although FIG. 10 shows the method proceeding to step S108 after step S107, additional steps similar to steps S102 to S104 may be required in implementations where there are more than two electrodes in a group of electrodes (e.g., as in FIG. 8). Accordingly, the method of FIG. 10 may be adapted to allow for other switching configurations of the switching apparatus 150 to be set for the respective time periods as discussed above.

Although it has been described that the touch-sensitive apparatus 1 of the present disclosure comprises a differential amplifier 160, 160' (into which two outputs from the sensor element 100 (e.g., the two outputs from the receiver electrodes Rx0 and Rx1) are received and the difference between the two input signals is output from the differential amplifier 160, 160'), it should be appreciated that any suitable electronic component that is capable of outputting a signal indicative of the differential of (i.e., the difference between) two input signals may be used in accordance with the principles of the present disclosure. In more general terms, the differential amplifier 160 is an example of what is termed here as a differential output element. The differential output element is, as alluded to above, an element which is configured to receive two input signals (and more specifically, two input signals which are indicative of a capacitive coupling associated with the sensor element 100) and output a differential output signal which is the differential, or proportional to the differential, of the two input signals. In this regard, the differential output element may perform any suitable transfer/conversion of the input signals depending on the implementation at hand. For example, the differential output element may receive current signals as the two input signals and output a voltage signal as the differential output signal, for example. Equally, the differential output element may perform a function such as amplifying the differential output signal, if desired or appropriate for the application at hand. One further example, aside from the differential amplifier 160, 160', of a differential output element is a current conveyor (or more particularly a differential current conveyor). The differential current conveyor is configured to receive two input signals from the sensor element 100 and output a signal which is, or is proportional to, the differential between the two input signals. Thus, what is significant to the principles of the present disclosure is the presence of a differential output element designed to output a signal that is, or is proportional to, the differential between two input signals received, in the context of the present disclosure, from a sensor element 100. Any suitable component acting as the differential output element may be used in accordance with the principles of the present disclosure.

The above has described the application of the present disclosure to touch-sensitive apparatuses which employ the mutual capacitance measurement technique to measure the mutual capacitance between a transmit electrode and a receiver electrode. However, the present disclosure may also be applied to touch-sensitive apparatuses which employ the self-capacitance measurement technique for measure the self-capacitance of an electrode.

Figure 11:
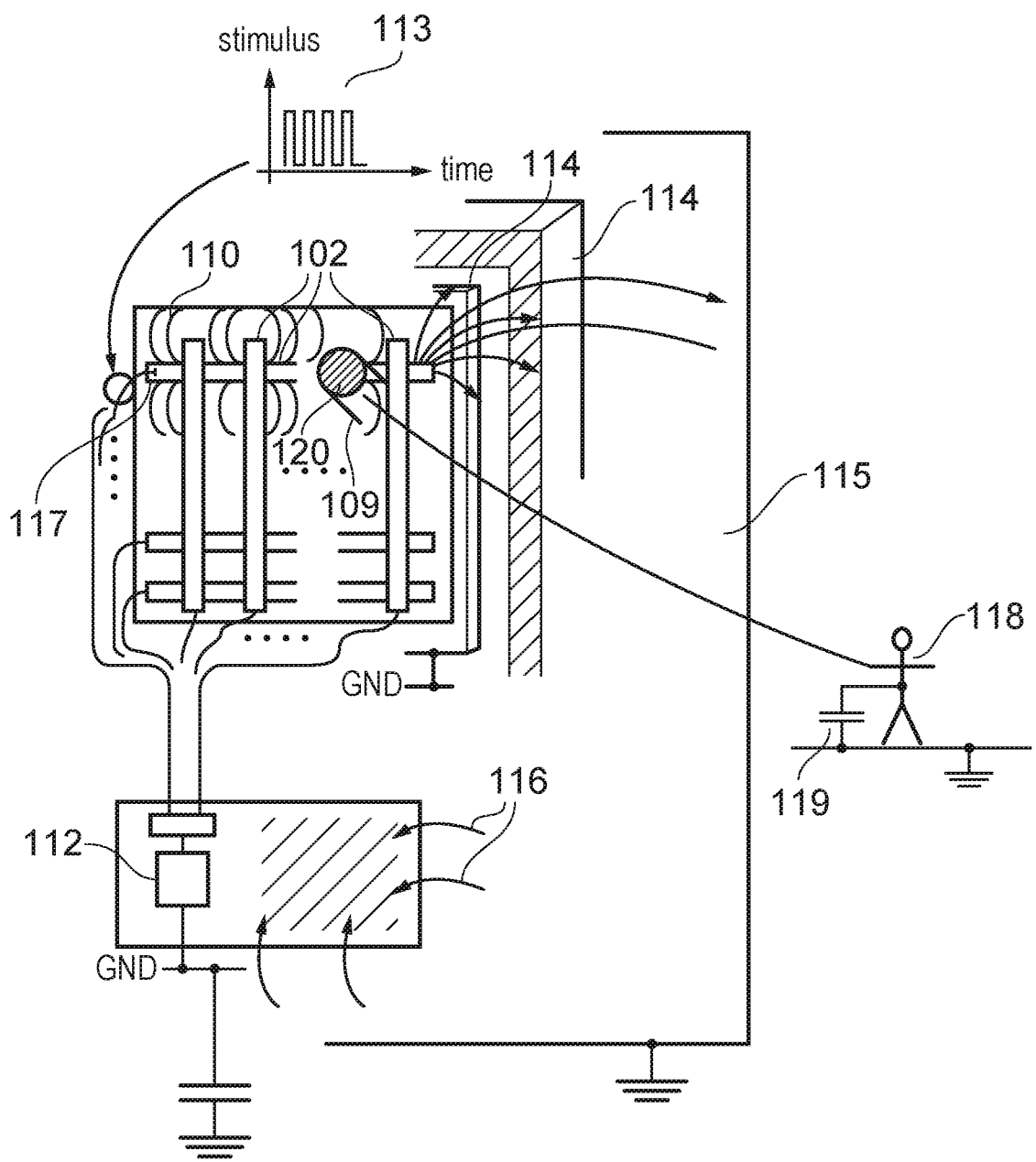
FIG. 11 schematically illustrates the self-capacitance approach applied to the touch sensitive apparatus of FIG. 1 in more detail, specifically with a view to explaining the principles of the self-capacitance measurement technique.

FIG. 11 schematically illustrates a self-capacitance measurement technique of the touch sensitive apparatus with a view to explaining the principles of the self-capacitance measurement technique. FIG. 11 is explained with reference to the touch-sensitive apparatus of FIG. 1 and it should be appreciated that the touch-sensitive apparatus of FIG. 1 may be configured to operate in the mutual capacitance sensing mode or the self-capacitance sensing mode (and in some instances may be configured to switch between the two).

In FIG. 11, the drive circuitry 112 of the measurement circuitry 105 is configured to generate and apply an electrical stimulus (drive signal) 113 to each electrode 101, 102 which will cause an electric field 110 to form around it. This field 110 couples through the space around the electrode back to the measurement circuitry 105 via numerous conductive return paths that are part of the nearby circuitry of the sensor element 100 and the product housing (shown schematically by reference numeral 114), or physical elements from the nearby surroundings 115 etc., so completing a capacitive circuit 116. The overall sum of return paths is typically referred to as the "free space return path" in an attempt to simplify an otherwise hard-to-visualize electric field distribution. The important point to realise is that the measurement circuitry 105 is only driving each electrode from a single explicit electrical terminal 117; the other terminal is the capacitive connection via this "free space return path". The capacitance measured by the measurement circuitry 105 is the "self-capacitance" of the sensor electrode (and connected tracks) that is being driven relative to free space (or Earth as it is sometimes called) i.e. the "self-capacitance" of the relevant sensor electrode. Touching or approaching the electrode with a conductive element, such as a human finger, causes some of the field to couple via the finger through the connected body 118, through free space and back to the measurement circuitry 105. This extra return path 119 can be relatively strong for large objects (such as the human body), and so can give a stronger coupling of the electrode's field back to the measurement circuitry 105; touching or approaching the electrode hence increases the self-capacitance of the electrode. The measurement circuitry 105 is configured to sense this increase in capacitance. The increase is strongly proportional to the area 120 of the applied touch 109 and is normally weakly proportional to the touching body's size (the latter typically offering quite a strong coupling and therefore not being the dominant term in the sum of series connected capacitances).

When the touch-sensitive apparatus 1 operates in accordance with the self-capacitance measuring mode, the processing circuitry 106 is configured to cause the drive signal as generated by the drive circuitry 112 to be applied to a group of electrodes (e.g., at least a first electrode and a second electrode). The group of electrodes (and thus at least the first and second electrode electrode) may comprise X-electrodes 101, Y-electrodes 102 or combinations thereof (in this regard, the X-electrodes and Y-electrodes can operate independently of one another). Assuming, the drive signal is applied only to a first and second electrode of the plurality of electrodes, then in accordance with the principles of the present disclosure, a switching apparatus (such as switching apparatus 150) is provided to couple the first electrode and the second electrode to the inputs of the differential amplifier 160. With reference to FIG. 4 to explain the differences between the self and mutual capacitance modes, instead of applying the drive signal to the transmit electrode Tx0 and coupling receiver electrodes Rx0 and Rx1 to the differential amplifier 160 which sense the mutual capacitance between the transmit and receiver electrodes, in the self-capacitance mode, the drive signal is applied directly to the receiver electrodes Rx0 and Rx1 (although strictly speaking these are no longer "receiver" electrodes). The switching apparatus 150 of FIG. 4 operates in substantially the same manner as described above, and thus signals output from the receiver electrodes Rx0 and Rx1 (which would now be indicative of the self-capacitance of the individual electrodes rather than mutual capacitance at intersections between the receiver electrodes Rx0, Rx1 and the transmit electrode Tx0) are coupled to the differential amplifier 160. The processing circuitry 106 may operate in the same manner as described with respect to FIG. 4, although the thresholds for detecting when a touch is present are likely to be altered due to the fact that the self-capacitance is inherently a different phenomenon to the mutual capacitance.

FIG. 4 shows the Y-electrodes coupled to the differential amplifier 160 and in the mutual capacitance mode switching circuitry 150 may be provided so as only to couple the Y-electrodes to the differential amplifier 160. However, as mentioned, the X-electrodes and Y-electrodes operate independently in the self-capacitance mode, so the touch-sensitive apparatus may be modified to include additional switching apparatus(es) to couple the X-electrodes to the differential amplifier 160. Additionally, in the self-capacitance mode, an entire scan of the sensor element 100 can be performed by measuring the self-capacitances of all electrodes. If one assumes the sensor element contains a grid of N×M electrodes, and the switching apparatus is held in each configuration for a time period of T, then the total scan time is (N+M)×T. Conversely, in the mutual capacitance mode, the total scan time for a similar N×M sensor element is (N×M)×T.

It should be appreciated that, in some implementations, the touch-sensitive apparatus may be configured to operate in both the mutual capacitance measurement mode and the self-capacitance measurement mode. That is, for example, the touch-sensitive apparatus may be configured to perform one or more mutual capacitance measurements from the sensor element 100 followed by one or more self-capacitance measurements or vice versa. For example, the touch-sensitive apparatus may perform a complete scan of the N×M sensor element 100 in the mutual capacitance mode followed by a complete scan of the sensor element 100 in the self-capacitance mode. The different capacitance sensing modes (self and mutual) have different advantages and disadvantages, so touch-sensitive apparatuses that combine both measurements may have superior performance in some respects that other touch sensitive apparatuses. The principles of the present disclosure may be applied to such touch sensitive apparatuses that operate in both the mutual and self-capacitance measurement modes.

Thus there has been described a touch-sensitive apparatus, including: a plurality of electrodes comprising at least a first electrode and a second electrode; drive circuitry configured to generate a drive signal for driving one or more of the plurality of electrodes; a differential output element comprising a first input and a second input configured to couple to each of the first electrode and second electrode and configured to output a signal indicative of the differential between signals input to the differential output element at the first input and the second input; switching circuitry configured to couple the first electrode to either of the first input or second input of the differential output element and to couple the second electrode to either of the first input or second input of the differential output element; and processing circuitry. The processing circuitry is configured to: obtain a first output from the differential output element during a first time period, wherein the switching circuitry is in a first configuration during the first time period; obtain a second output from the differential output element during a second time period, wherein the switching circuitry is in a second configuration during the second time period; and determine a resultant signal corresponding to a capacitance as sensed by the first or second electrodes based on both the first output and the second output. Also described is a system comprising the touch-sensitive apparatus and a method of operating a touch-sensitive apparatus.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. A touch-sensitive apparatus, the apparatus comprising:
a plurality of electrodes comprising at least a first electrode and a second electrode;
drive circuitry configured to generate a drive signal for driving one or more of the plurality of electrodes;
a differential output element comprising a first input and a second input configured to couple to each of the first electrode and second electrode and configured to output a signal indicative of the differential between signals input to the differential output element at the first input and the second input;
switching circuitry configured to couple the first electrode to either of the first input or second input of the differential output element and to couple the second electrode to either of the first input or second input of the differential output element; and
processing circuitry configured to:
obtain a first output from the differential output element during a first time period, wherein the switching circuitry is in a first configuration during the first time period;
obtain a second output from the differential output element during a second time period, wherein the switching circuitry is in a second configuration during the second time period; and determine a resultant signal corresponding to a capacitance as sensed by the first or second electrodes based on both the first output and the second output;

wherein the switching circuitry is configured to couple the first electrode to either of the first input or second input of the differential output element during both the first time period and the second time period and wherein the switching circuitry is configured to couple the second electrode to either of the first input or second input of the differential output element during both the first time period and the second time period;

wherein the apparatus comprises a plurality of differential output elements and a plurality of groups of electrodes, wherein each group of electrodes comprises switching circuitry configured to couple each of the electrodes of the group of electrodes to a same one of the plurality of differential output elements, wherein a first group of electrodes comprises the first and second electrodes arranged to couple to the differential output element, wherein each group of electrodes comprises an even number of electrodes.

2. The touch-sensitive apparatus of claim 1, wherein the switching circuitry is configured to couple the first electrode and the second electrode to the first input of the differential output element during the first time period.

3. The touch-sensitive apparatus of claim 1, wherein the switching circuitry is configured to couple the first electrode to the first input of the differential output element during the second time period, and the second electrode to the second input of the differential output element during the second time period.

4. The touch-sensitive apparatus of claim 1, wherein the processing circuitry is configured to determine the resultant signal corresponding to a capacitance as sensed by the first electrode by summing the first output and the second output.

5. The touch-sensitive apparatus of claim 1, wherein the processing circuitry is configured to determine the resultant signal corresponding to a capacitance as sensed by the second electrode by subtracting the second output from the first output.

6. The touch-sensitive apparatus of claim 1, wherein the apparatus is configured such that the first and second electrodes are coupled to one of the first input and the second input during both the first time period and the second time period.

7. The touch-sensitive apparatus of claim 1, wherein the touch-sensitive apparatus is configured to operate in the mutual capacitance sensing mode to sense a mutual capacitance between pairs of electrodes, wherein the processing circuitry is configured to cause the drive circuitry to apply the drive signal to a drive electrode of the plurality of electrodes, and wherein the first electrode is a first receiver electrode and the second electrode is a second receiver electrode, the first and second receiver electrodes are arranged so as to electrically couple to the drive electrode, and the processing circuitry is configured to determine the resultant signal corresponding to a mutual capacitance between the first or second receiver electrodes and the drive electrode based on both the first output and the second output.

8. The touch-sensitive apparatus of claim 1, wherein the touch-sensitive apparatus is configured to operate in the self-capacitance sensing mode to sense a self-capacitance of an electrode, wherein the processing circuitry is configured to cause the drive circuitry to apply the drive signal to the first and second electrodes of the plurality of electrodes, and the processing circuitry is configured to determine the resultant signal corresponding to a self-capacitance of the first and/or second electrodes based on both the first output and the second output.

9. The touch-sensitive apparatus of claim 1, wherein the differential output element is a differential amplifier.

10. The touch-sensitive apparatus of claim 9, wherein the differential amplifier comprises two output channels and the output from the differential amplifier is the difference between the two output channels.

11. The touch-sensitive apparatus of claim 10, wherein the differential amplifier is a transimpedance amplifier or an instrument amplifier.

12. The touch-sensitive apparatus of claim 1, wherein the apparatus further comprises a third electrode and a fourth electrode, wherein the switching circuitry is configured to couple the third electrode to either of the first input or second input of the differential output element and to couple the fourth electrode to either of the first input or second input of the differential output element.

13. The touch-sensitive apparatus of claim 12, wherein the processing circuitry is further configured to:

obtain a third output from the differential output element during a third time period, wherein the switching circuitry is in a third configuration during the third time period;

obtain a fourth output from the differential output element during a fourth time period, wherein the switching circuitry is in a fourth configuration during the fourth time period; and determine a resultant signal corresponding to a capacitance as sensed by the first, second, third or fourth electrodes based on a combination of the first, second, third and fourth outputs from the differential output element.

14. The touch-sensitive apparatus of claim 1, wherein the apparatus comprises fewer differential output elements than electrodes.

15. A system comprising the touch-sensitive apparatus of claim 1, further comprising system processing circuitry communicatively coupled to the processing circuitry of the touch-sensitive apparatus.

16. The system of claim 15, wherein the system processing circuitry is configured to cause the system to perform a first action in response to receiving a signal output from the processing circuitry of the touch-sensitive apparatus indicating the presence of a touch on a touch-sensitive element of the touch-sensitive apparatus.

17. A method for operating a touch-sensitive element of a touch-sensitive apparatus, the touch sensitive apparatus comprising a plurality of electrodes, comprising at least a first electrode and a second electrode, the method comprising:

applying a drive signal to at least one of the plurality of electrodes;

obtaining a first output from a differential output element during a first time period, wherein switching circuitry configured to couple the first electrode to either of the first input or second input of the differential output element and to couple the second electrode to either of the first input or second input of the differential output element is in a first configuration during the first time period;

obtaining a second output from the differential output element during a second time period, wherein the switching circuitry is in a second configuration during the second time period, wherein the switching circuitry is configured to couple the first electrode to either of the first input or second input of the differential output element during both the first time period and the second time period and wherein the switching circuitry is configured to couple the second electrode to either of the first input or second input of the differential output element during both the first time period and the second time period; and determining a resultant signal corresponding to a capacitance as sensed by the first or second electrodes based on both the first output and the second output;

wherein the apparatus comprises a plurality of differential output elements and a plurality of groups of electrodes, wherein each group of electrodes comprises switching circuitry configured to couple each of the electrodes of the group of electrodes to a same one of the plurality of differential output elements, wherein a first group of electrodes comprises the first and second electrodes arranged to couple to the differential output element, wherein each group of electrodes comprises an even number of electrodes.

\* \* \* \* \*